US012572028B2

(12) United States Patent
Bhagavatula et al.

(10) Patent No.: US 12,572,028 B2
(45) Date of Patent: Mar. 10, 2026

(54) DISPLAY SYSTEM FOR RENDERING A SCENE WITH MULTIPLE FOCAL PLANES

(71) Applicant: Carnegie Mellon University, Pittsburgh, PA (US)

(72) Inventors: Vijayakumar Bhagavatula, Pittsburgh, PA (US); Aswin Sankaranarayanan, Pittsburgh, PA (US); Jen-Hao Chang, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 159 days.

(21) Appl. No.: 16/976,967

(22) PCT Filed: Mar. 5, 2019

(86) PCT No.: PCT/US2019/020779
§ 371 (c)(1),
(2) Date: Aug. 31, 2020

(87) PCT Pub. No.: WO2019/173357
PCT Pub. Date: Sep. 12, 2019

(65) Prior Publication Data
US 2021/0364817 A1     Nov. 25, 2021

Related U.S. Application Data

(60) Provisional application No. 62/710,972, filed on Mar. 5, 2018.

(51) Int. Cl.
*G02B 30/56*          (2020.01)
*G02B 3/14*           (2006.01)
(Continued)

(52) U.S. Cl.
CPC ............... *G02B 30/56* (2020.01); *G02B 3/14* (2013.01); *G02B 26/0833* (2013.01);
(Continued)

(58) Field of Classification Search
CPC ...... G02B 30/56; G02B 3/14; G02B 26/0833; G02B 27/0075; G02B 2027/0127;
(Continued)

(56) References Cited

U.S. PATENT DOCUMENTS

2001/0040671 A1     11/2001   Metcalf
2006/0275025 A1*    12/2006   Labaziewicz ...... H04N 5/23296
                                                          348/E5.042
(Continued)

OTHER PUBLICATIONS

Chang et al., "Accommodating the human eye by building virtual worlds with dense focal stacks," ACM Transactions on Graphics, 2000, 11 pages.
(Continued)

*Primary Examiner* — Chanh D Nguyen
*Assistant Examiner* — Gloryvid Figueroa-Gibson
(74) *Attorney, Agent, or Firm* — Fish & Richardson P.C.

(57)          ABSTRACT

A display system includes an optical element positioned in the optical path to receive light from the display module and direct the light into a field of view to display a scene. The optical element has a focal length on an optical axis of the optical element that varies in response to a control signal. A control system is programmed to generate the control signal to cause the optical element to cycle through a series of focal lengths at a frequency. Each focal length of the series corresponds to a focal plane of a series of focal planes. The control system is programmed to vary the light field from the display module to display the scene as a sequence of different image frames, the different image frames being synchronized so that each of the different image frames is presented at a corresponding one of the series of focal planes.

21 Claims, 22 Drawing Sheets

(51) Int. Cl.
  *G02B 26/08* (2006.01)
  *G09G 3/00* (2006.01)
  *G09G 3/3208* (2016.01)
  *G09G 3/34* (2006.01)

(52) U.S. Cl.
  CPC ........... *G09G 3/003* (2013.01); *G09G 3/3208* (2013.01); *G09G 3/346* (2013.01); *G09G 2360/14* (2013.01)

(58) Field of Classification Search
  CPC ........ G02B 2027/0185; G02B 27/0101; G02B 30/10; G02B 30/52; G09G 3/003; G09G 3/3208; G09G 3/346; G09G 2360/14; G06F 3/147
  USPC ......................................................... 345/207
  See application file for complete search history.

(56) References Cited

U.S. PATENT DOCUMENTS

| | | | | |
|---|---|---|---|---|
| 2007/0248350 | A1* | 10/2007 | Baker | G03B 37/04 |
| | | | | 396/322 |
| 2010/0073467 | A1* | 3/2010 | Nam | G02B 30/27 |
| | | | | 348/54 |
| 2012/0287291 | A1* | 11/2012 | McMahon | H04N 21/235 |
| | | | | 348/207.1 |
| 2013/0033485 | A1* | 2/2013 | Kollin | G06F 3/0484 |
| | | | | 345/660 |
| 2014/0055692 | A1* | 2/2014 | Kroll | G03H 1/02 |
| | | | | 29/846 |
| 2014/0300869 | A1* | 10/2014 | Hirsch | G02B 30/27 |
| | | | | 353/38 |
| 2015/0205126 | A1* | 7/2015 | Schowengerdt | H04N 13/344 |
| | | | | 345/633 |
| 2017/0195652 | A1 | 7/2017 | Du et al. | |
| 2017/0214907 | A1 | 7/2017 | Lapstun | |
| 2017/0261746 | A1* | 9/2017 | Tam | H04N 13/332 |
| 2017/0301313 | A1* | 10/2017 | Perreault | G02B 26/004 |
| 2018/0007343 | A1* | 1/2018 | Send | H04N 9/0451 |
| 2019/0139472 | A1* | 5/2019 | Liu | G02B 26/004 |
| 2020/0150379 | A1* | 5/2020 | Boev | G02B 7/09 |

OTHER PUBLICATIONS

International Preliminary Report on Patentability in International Appln. No. PCT/US2019/020779, dated Sep. 8, 2020, 10 pages.
International Search Report and Written Opinion in International Appln. No. PCT/US2019-020779, dated Jun. 28, 2019, 13 pages.

* cited by examiner

400
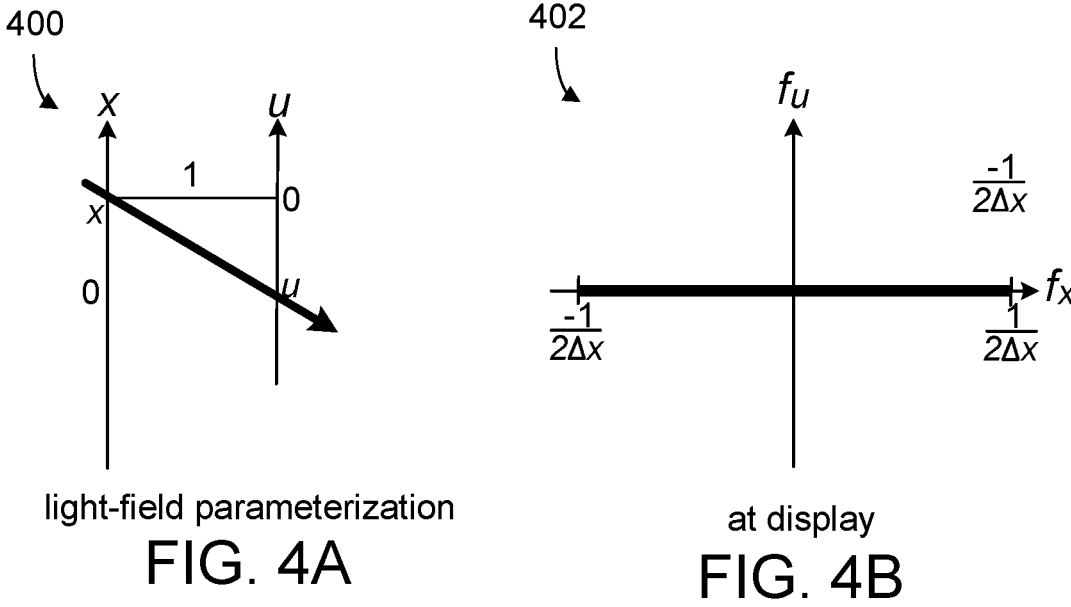
light-field parameterization
FIG. 4A
402
at display
FIG. 4B
404
propagating $d_o$
FIG. 4C
406
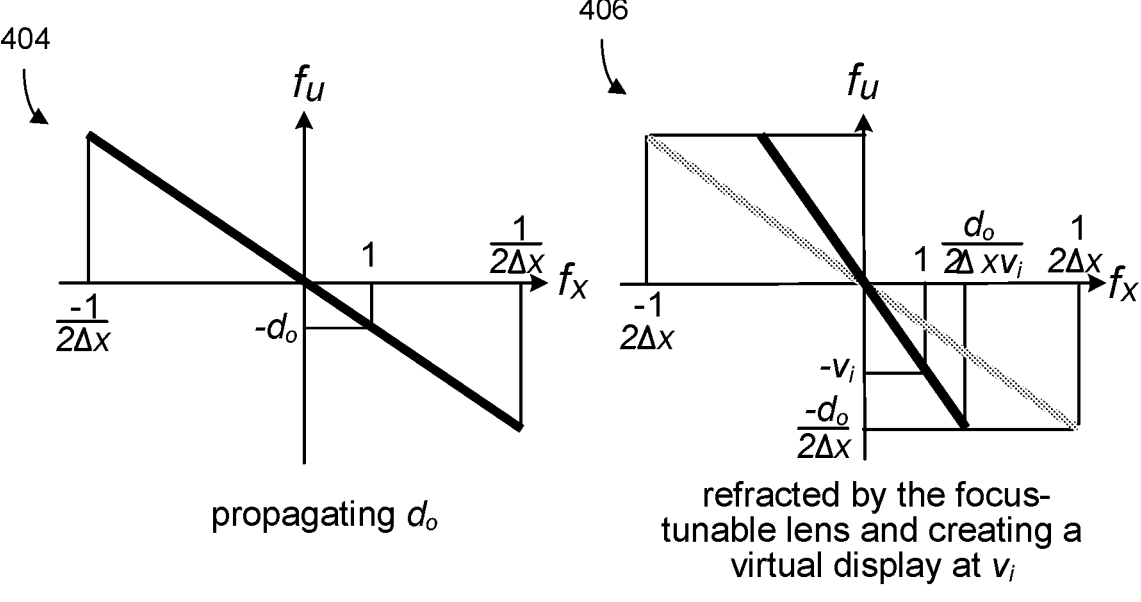
refracted by the focus-
tunable lens and creating a
virtual display at $v_i$
FIG. 4D

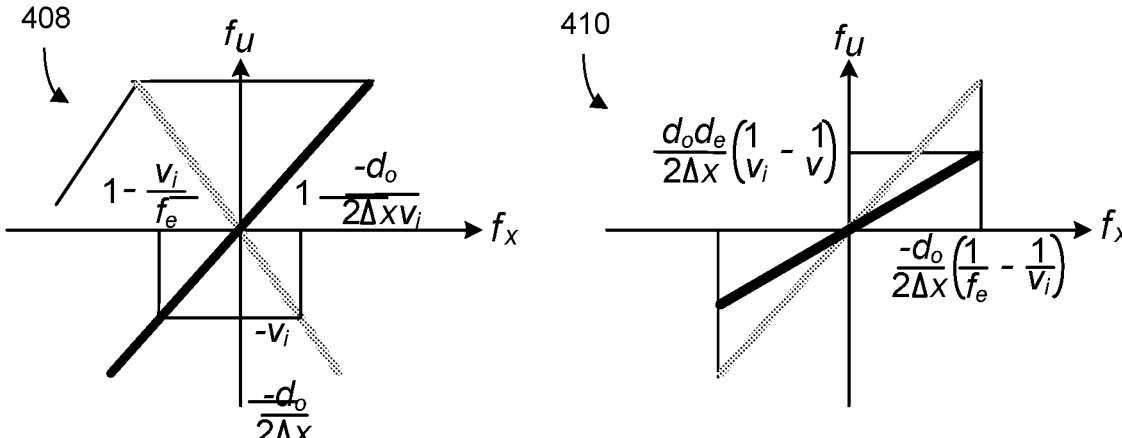
(e) refracted by the lens in our eye, whose focal length is $f_e$
FIG. 4E
(f) propagating $d_e$ to the retina
FIG. 4F
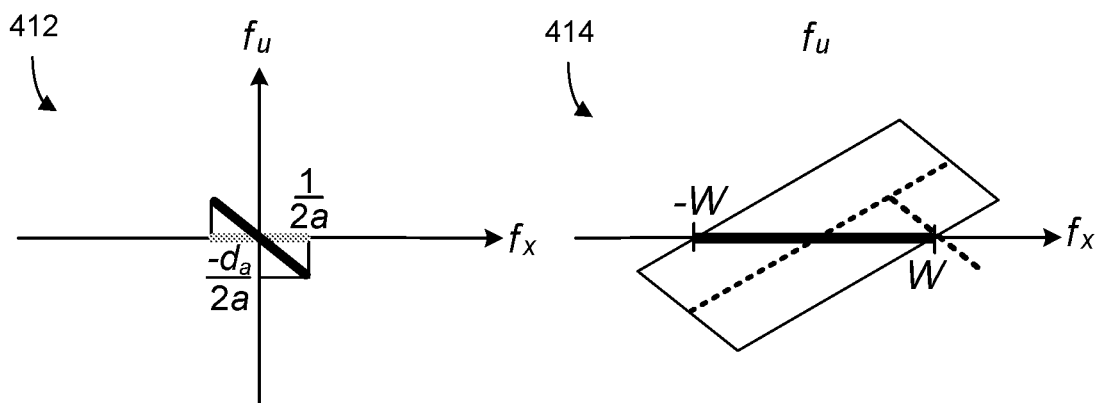
(g) aperture function propagated $d_e$ to the retina
FIG. 4G
(h) cross-correlation of (f) and (g) results in the light field at the retina(shaded blue).Out eye sees the slice along $f_x$.
FIG. 4H

700

(a) Camera focuses at 25 cm (b) Camera focuses at 30 cm (c) Camera focuses at ~ 1.2 cm (d) Camera focuses at infinity

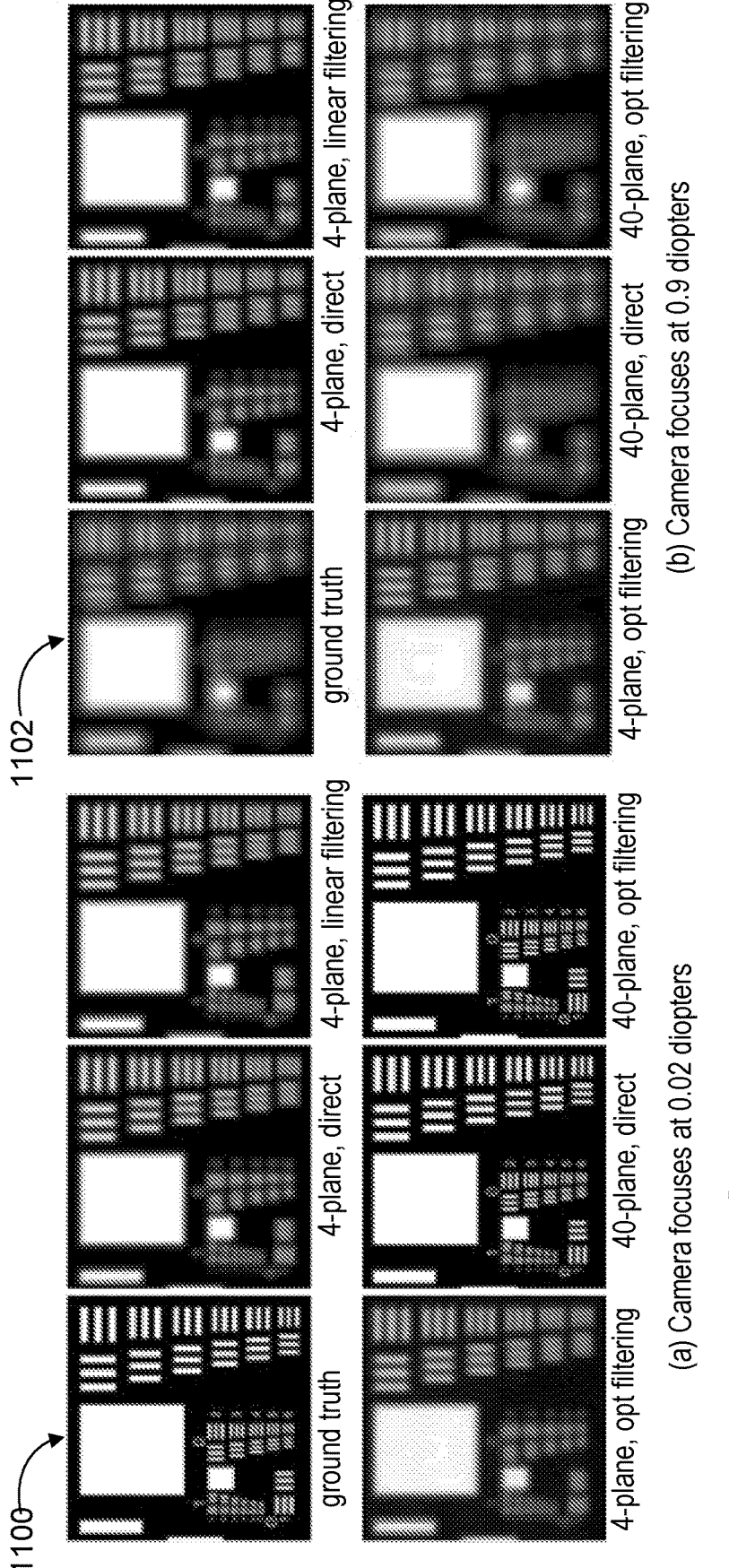

(c) 30-plane (b) 40-plane (a) in-focus (e) 4-plane (d) 20-plane (c) Modulation transfer functions of (b)

(f) modulation transfer function

1300

Focused at the 1st focal plane (0.25m)   Focused at the 10th focal plane (0.32m)   Focused at the 20th focal plane (0.49m)   Focused at the 40th focal plane ∞

(a) multifocal display with four focal planes and no depth filtering (b) multifocal display with four focal planes and linear depth filtering (c) proposed display with 40 focal planes and no depth filtering

1400

1600 ground truth 4-plane, direct quantization 4-plane, linear filtering 4-plane, optimization-based-filtering 40-plane, direct quantization 40-plane, optimization-based filtering (a) Camera focuses at 0.02 diopters (off-plane location of the 4-plane display)

1700

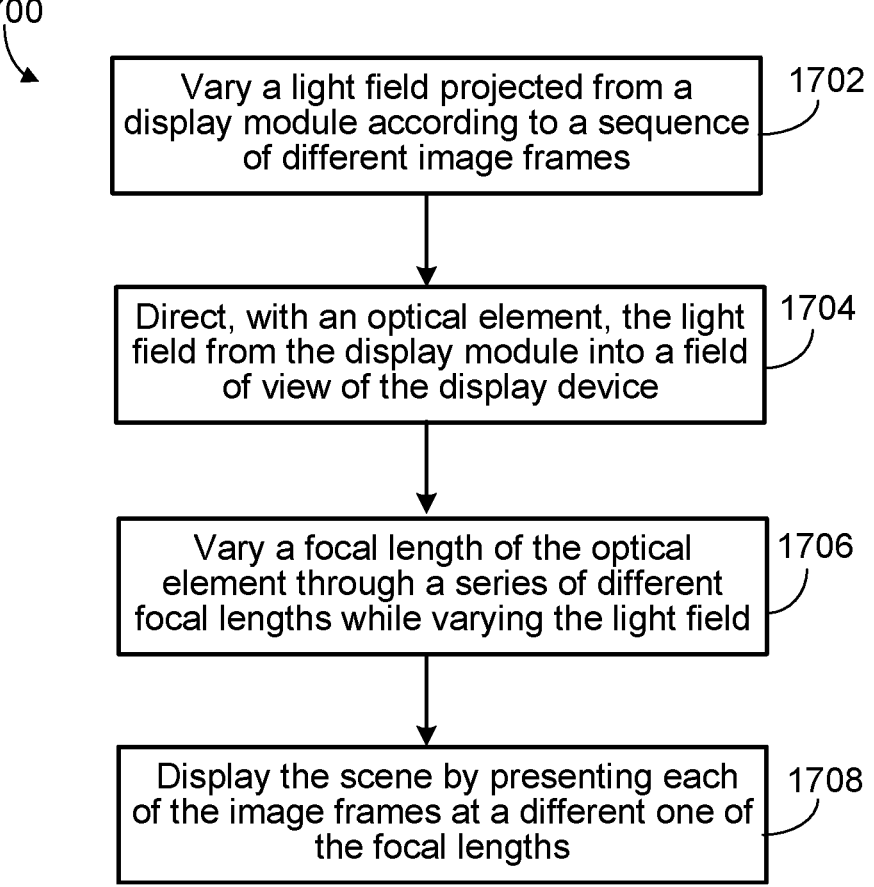

Vary a light field projected from a display module according to a sequence of different image frames    1702

Direct, with an optical element, the light field from the display module into a field of view of the display device    1704

Vary a focal length of the optical element through a series of different focal lengths while varying the light field    1706

Display the scene by presenting each of the image frames at a different one of the focal lengths    1708

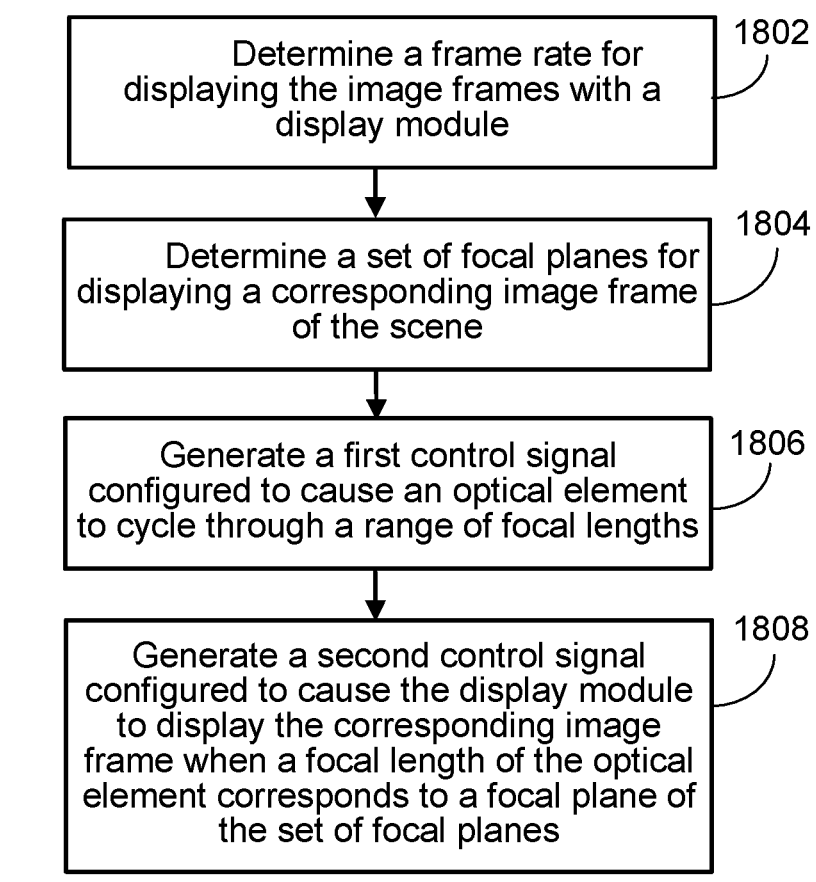

1802

Determine a frame rate for displaying the image frames with a display module

1804

Determine a set of focal planes for displaying a corresponding image frame of the scene

1806

Generate a first control signal configured to cause an optical element to cycle through a range of focal lengths

1808

Generate a second control signal configured to cause the display module to display the corresponding image frame when a focal length of the optical element corresponds to a focal plane of the set of focal planes

FIG. 18

DISPLAY SYSTEM FOR RENDERING A SCENE WITH MULTIPLE FOCAL PLANES

CLAIM OF PRIORITY

This application is the national stage entry of International Patent Application No. PCT/US2019/020779, filed on Mar. 5, 2019, and claims priority under 35 U.S.C. § 119(e) to U.S. Patent Application Ser. No. 62/710,972, filed on Mar. 5, 2018, the entire contents of each of which are hereby incorporated by reference.

GOVERNMENT SUPPORT CLAUSE

This invention was made with government support under CCF1652569 awarded by the National Science Foundation. The government has certain rights in the invention.

TECHNICAL FIELD

This application relates to rendering three-dimensional scenes in a display system, particularly with respect to augmented reality and/or virtual reality.

BACKGROUND

The human eye automatically changes the focus of its lens to provide sharp, in-focus images of objects at different depths. While convenient in the real world, for virtual or augmented reality (VR/AR) applications, this focusing capability of the eye often causes a problem that is called the vergence-accommodation conflict (VAC). Vergence refers to the simultaneous movement of the two eyes so that a scene point comes into the center of the field of view, and accommodation refers to the changing of the focus of the ocular lenses to bring the object into focus. In the real world, these two cues act in synchrony. However, most commercial VR/AR displays render scenes by only satisfying the vergence cue, i.e., they manipulate the disparity of the images shown to each eye. But given that the display is at a fixed distance from the eyes, the corresponding accommodation cues are invariably incorrect, leading to a conflict between vergence and accommodation that can cause discomfort, fatigue, and distorted 3D perception, especially after long durations of usage.

SUMMARY

This document describes a virtual reality display that is capable of generating a dense collection of depth/focal planes. This is achieved by driving a focus-tunable lens to sweep a range of focal lengths at a high frequency and, subsequently, tracking the focal length precisely at microsecond time resolutions using an optical module. Precise tracking of the focal length, coupled with a high-speed display, enables the display system to generate 1600 focal planes per second. This enables a novel first-of-its-kind virtual reality multifocal display that is capable of resolving the vergence-accommodation conflict of conventional displays.

The display system is capable of addressing the VAC by displaying content on a dense collection of depth or focal planes. The display system 100 falls under the category of multifocal displays, i.e., displays that generate content at different focal planes using a focus-tunable lens. This change in focal length can be implemented in one of many ways; for example, by changing the curvature of a liquid lens, the state of a liquid-crystal lens, the polarization of a waveplate lens, or the relative orientation between two carefully designed phase plates.

The display system displays a stack of focal planes that are an order of magnitude greater in number as compared to conventional display systems without any loss in the frame and displaying 1600 focal planes per second, which can be used to display scenes with 40 focal planes per frame at 40 frames per second. As a consequence, the display system can to render virtual worlds at a realism that is hard to achieve with current multifocal display designs.

A limitation of conventional display systems that limits the depth resolution of a multifocal display is the operational speed of its focus-tunable lens. Focus-tunable liquid lenses change their focal length based on an input driving voltage. Focus-tunable lenses typically require around 5 ms to settle onto a particular focal length. To wait for the lens to settle so that the displayed image is rendered at the desired depth results in, at most, 200 focal planes per second. For a display operating with 30-60 frames per second (fps), this would imply anywhere between three and six focal planes per frame.

While focus-tunable lenses have long settling times, a frequency response of the focus-tunable lens is rather broad and has a cut-off upwards of 1000 Hz. The display system is configured to drive the lens with excitations that are different from a simple step edge (i.e., a change in voltage). For example, the display system is configured to cause the lens to sweep through the entire range of focal lengths at a high frequency. In some implementations, a sinusoid or a triangular voltage of the desired frequency is used as a driving signal.

The display system is configured to track the focal length of the lens in real-time. The display system is configured to accurately display focal planes at any depth without waiting for the lens to settle. In other words, by driving the focus-tunable lens to periodically sweep the desired range of focal lengths and tracking the focal length at high-speed and in real-time, the display system can display numerous (e.g., greater than 5, 10, 25, or 40 focal planes at refresh rates of greater than 40 frames per second.

The display system has the following advantages. The display system is configured for high-speed focal-length tracking. For example, the display system is configured for real-time tracking of the focal length of a focus-tunable lens at microsecond-scale resolutions. The focal-length tracking system of the display system is configured measuring the deflection of a laser incident on the lens to track the focal length of the lens continuously. The display system is configured to display a dense set of focal planes to mitigate a loss of spatial resolution due to the defocus blur caused by the ocular lens. This is shown below by analytical derivation of the spatial resolution of the image formed on the retina when there is a mismatch between the focus of the eye and the depth at which the content is virtually rendered. This analysis justifies the need for AR/VR displays capable of a high focal-plane density. The display system is configured to produce at least 40 8-bit focal planes per frame with 40 fps. This corresponds to 1600 focal planes per second, which is a capability that is an order of magnitude greater than competing approaches.

The display system includes a display module configured to provide a variable light field along an optical path of the display system. The display system includes an optical element positioned in the optical path to receive light from the display module and direct the light into a field of view of the display system to display a scene in the field of view, the optical element having a focal length on an optical axis of the optical element that varies in response to a control signal. The display system includes a control system in communication with the display module and the optical element, the control system being programmed to generate the control signal to cause the optical element to cycle through a series of focal lengths at a frequency, each focal length of the series corresponding to a focal plane of a series of focal planes. The control system is further programmed to vary the light field from the display module to display the scene as a sequence of different image frames. The different image frames are synchronized with the control signal so that each of the different image frames is presented at a corresponding one of the series of focal planes.

In some implementations, the control signal is configured to cause the optical element to continuously adjust the focal length across a range between a minimum focal length and a maximum focal length.

In some implementations, the display system includes a focal length tracking module, the focal length tracking module configured to monitor variations of the focal length of the optical element and provide feedback to the control system. In some implementations, the focal length tracking module includes a light emitting device configured to emit a beam of light through the optical element, and a light-sensitive sensor configured to detect a deflection of the beam of light through the optical element. The amount of the deflection of the beam of light is a function of the focal length of the optical element. In some implementations, The focal length tracking module includes a light emitting device configured to illuminate the optical element to generate an optical wavefront, and a light sensitive device configured to receive the optical wavefront from the optical element and determine a curvature of the optical element.

In some implementations, the series of focal planes includes at least five focal planes. In some implementations, the series of focal planes comprises at least 25 focal planes.

In some implementations, each scene frame of the display element includes an image frame at each focal plane of the series of focal planes.

In some implementations, the display module includes projection optics arranged to direct light from a spatial light modulator to the optical element.

In some implementations, the optical element comprises a focus-tunable lens. In some implementations, the optical element is an adjustable mirror or an adjustable phase mask.

In some implementations, the display module comprises a digital micromirror array. In some implementations, the display module comprises one or more of an OLED screen and a microLED screen.

In an aspect, the display system includes a multi-focal display configured to display images comprising at least five focal planes per frame. A focus-tunable lens is configured to vary a focal length corresponding to each of the at least five focal planes per frame.

In an aspect, a method of displaying a scene using a display device includes varying a light field projected from a display module according to a sequence of different image frames. The method includes directing, with an optical element, the light field from the display module into a field of view of the display device and varying a focal length of the optical element through a series of different focal lengths while varying the light field to display the scene by presenting each of the image frames at a different one of the focal lengths.

In an aspect, a method of displaying a scene comprising a series of image frames at different positions in a depth of field of the scene using a display device includes determining a frame rate for displaying the image frames with a display module. The method includes determining a set of focal planes for displaying a corresponding image frame of the scene. The method includes generating a first control signal configured to cause an optical element to cycle through a range of focal lengths at a frequency lower than the frame rate. The method includes generating a second control signal configured to cause the display module to display the corresponding image frame when a focal length of the optical element corresponds to a focal plane of the set of focal planes, the image frame corresponding to the focal plane for the depth of field of the scene.

In some implementations, the method further includes receiving, from a sensing element, a signal representing a variation of a focal length of the optical element, and adjusting, in response to the receiving, either the first control signal, the second control signal, or both the first and second control signals.

In some implementations, the second control signal comprises an indicator representing, for one or more pixels of the scene, the image frame for displaying the one or more pixels by the display element. Determining the frame rate includes determining a per-frame bit-depth of the display element.

In some implementations, determining the set of focal planes comprises selecting a maximum focal plane corresponding to a maximum distance, selecting a minimum focal plane corresponding to a minimum distance, and selecting a number of focal planes to interpolate between the maximum focal plane and the minimum focal plane based on the per-frame bit-depth of the display element.

In some implementations, the set of focal planes includes at least five focal planes. In some implementations, the set of focal planes includes at least 25 focal planes.

The details of one or more embodiments of the display system are set forth in the accompanying drawings and the description below. Other features, objects, and advantages of the invention will be apparent from the description and drawings, and from the claims.

DESCRIPTION OF DRAWINGS

FIG. 4 shows Fourier transforms of a light field at each stage of the display system.
FIGS. 11A-B show simulation results of scenes displayed by the display system.

FIGS. 17-18 show example processes for displaying a scene including a set of focal planes.

Like reference symbols in the various drawings indicate like elements.

DETAILED DESCRIPTION

Figure 1:
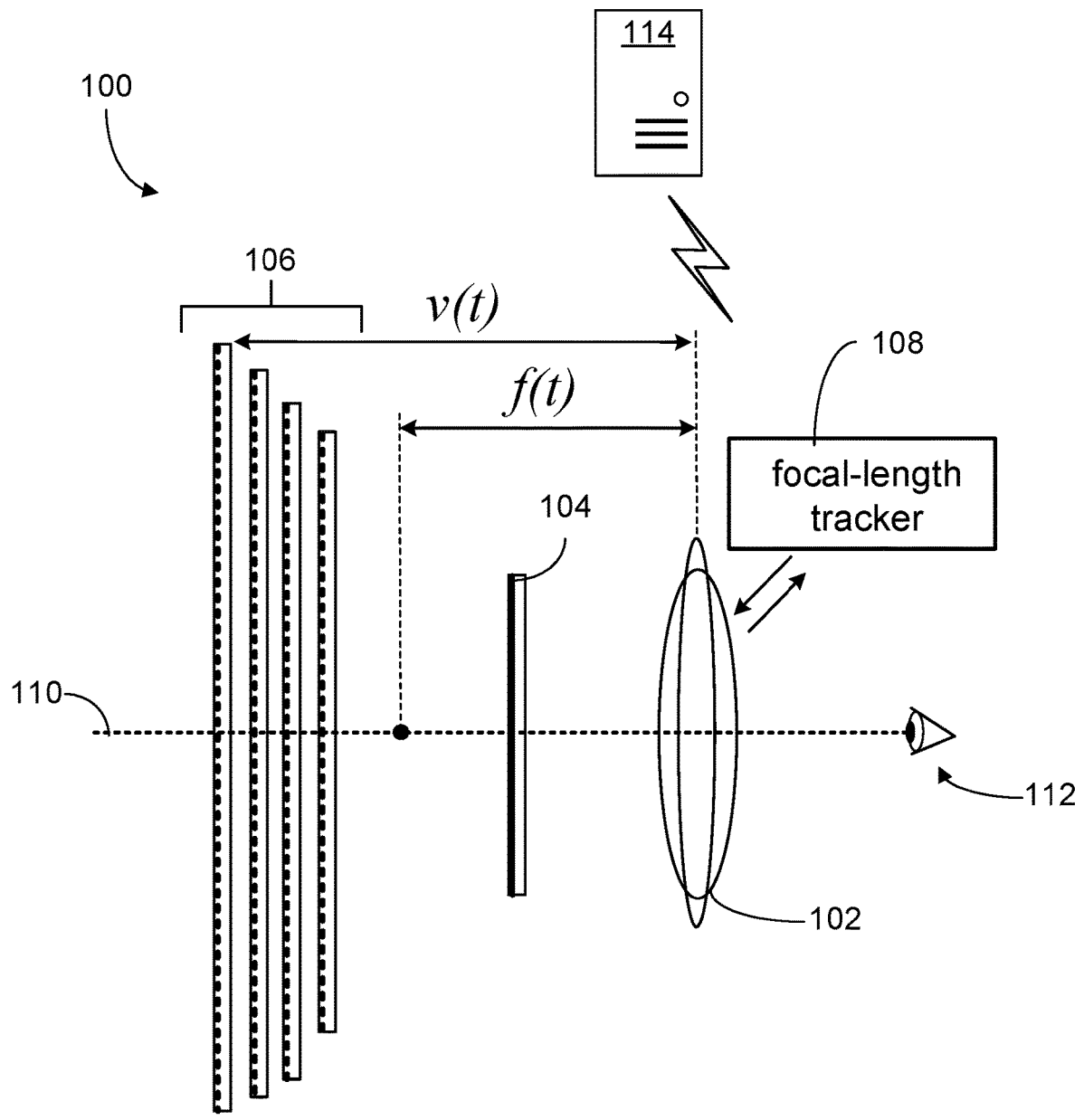
FIG. 1 shows an example of a portion of a display system.

FIG. 1 shows an example of a portion of a display system 100. The display system 100 includes a display module 104 configured to provide a variable light field along an optical path of the display system 100. An optical element 102 is positioned in the optical path to receive light from the display module 104 and direct the light into a field of view 112 of the display system to display a scene in the field of view.

In some implementations, the optical element 102 has a focal length on an optical axis 110 of the optical element that varies in response to a control signal. For example, the optical element 102 can include a focus-tunable lens. The control signal can include an applied voltage, an applied current, etc. depending on the particular optical element 102. In some implementations, the optical element 102 includes an adjustable mirror or an adjustable phase mask.

The display module 104 is configured to provide the light field through the optical element 102 for viewing (e.g., by a user). A scene is displayed on the display module 104. Generally, the scene includes multiple image frames, and each image frame corresponds to a focal plane of a focal plane stack 106. In some implementations, each image frame corresponds to a different focal plane. When displaying the scene, the display module 104 cycles through each image frame of the scene for a particular frame of the scene. The number of image frames of the scene per scene frame depend on the bit-depth of the scene. The bit-depth determines how many focal planes are in the focal plane stack 106. Once each image frame is displayed for each focal plane of the focal plane stack 106, the next frame of the scene is shown.

In some implementations, the display module 104 includes projection optics arranged to direct light from a spatial light modulator to the optical element. For example, the display module 104 can include a digital micromirror device (DMD), such as a digital micromirror array. In some implementations, the display module 104 includes an OLED screen. As long as the display module 104 is capable of refreshing the display frequently enough to display each frame of the scene and each image frame of the scene frame. In this way, the frame rate of the display module is greater than the frame rate of the displayed scene, because each scene frame includes the number of image frames corresponding to the number of focal planes for that scene frame.

The display system 100 includes a control system 114 in communication with the display module and the optical element. The control system 114 generally includes a computing system. The control system 114 is configured (e.g., programmed) to generate a control signal to cause the optical element to cycle through a series of focal lengths at a frequency. The control signal can include one or more of an analog signal or a digital signal, depending on the interface of the control system with the optical element 102 and the display module 104. Each focal length of the series of focal lengths corresponds to a to a focal plane of the focal plane stack 106 (also called a series of focal planes).

The control system 114 is configured to cause the optical element 102 to vary its focal length in order to cause the light of the display module 104 to appear at various focal planes of the focal plane stack 106. To achieve this, the control system 114 causes the optical element 102 to continuously sweep through a range of focal lengths, from a minimum to a maximum focal length (and/or vice versa). For example, the control system 114 can output a triangle waveform to cycle the optical element 102 from a minimum focal length to a maximum focal length, and then back to the minimum focal length (showing two scene frames). Each iteration of adjusting through the range of focal lengths constitutes a scene frame, as previously described. The frequency of sweeping though the range of focal lengths is thus less than the frame rate of the display, so that the display can update to show an image frame at each focal plane of the focal plane stack 106. The control system 114 is configured to vary the light field from the display module 104 to display the scene as a sequence of the different image frames. A signal can be sent from the control system to synchronize the different image frames so that each of the different image frames is presented at a corresponding one of the series of focal planes. The focal length of the optical element 102 can be continuously changed, meaning that a waveform with a non-zero derivative is continuously generated by the control system 114 to adjust the focal length of the optical element 102. This is in contrast to controlling the optical element 102 to discrete focal lengths by a step function waveform (or similar control signal).

In some implementations, the focal length of the optical element 102 is continuously adjusted through the range of focal lengths. The range of focal lengths can be based on the particular optical element 102. For example, the range of focal lengths is generally from a 5 cm minimum to a maximum of infinity (e.g., no focusing of incoming light). This approximates the range of human vision and provides a realistic depth to the scene. When the optical element 102 has a focal length that corresponds to a focal plane of the focal plane stack 106, the display module 104 displays the desired image for that focal plane. In some implementations, the series of focal planes includes at least five focal planes. In some implementations, the series of focal planes includes at least 25 focal planes. With this configuration, the display system 100 is capable of potentially displaying each pixel of the display module 104 at many focal plane depths with different contents. The display system 100 is not limited to displaying a particular pixel for a scene frame at a single focal plane, or leaving the pixel unchanged for the scene frame. Rather, the pixel can change for each image frame displayed in the scene frame.

In some implementations, the display system 100 includes a focal length tracking module 108 configured to track the focal length of the optical element 102 and provide feedback to the control system 114. While the focal length tracking module 108 is not required for operation of the display system 100, the feedback provided by the focal length tracking module 108 can increase the accuracy of the synchronization of the display module 104 and the optical element 102. For example, the focal length tracking module 108 can provide feedback to the control system 114 so that the control system 114 can cause the display module 104 to display the correct image at the right time, so that the image is displayed when the optical element 102 has the desired focal length, and thus the image is displayed at the correct focal plane of the focal plane stack 106. The focal length tracking module 108 is described in relation to FIGS. 5A-5B and FIG. 15.

Figure 2:
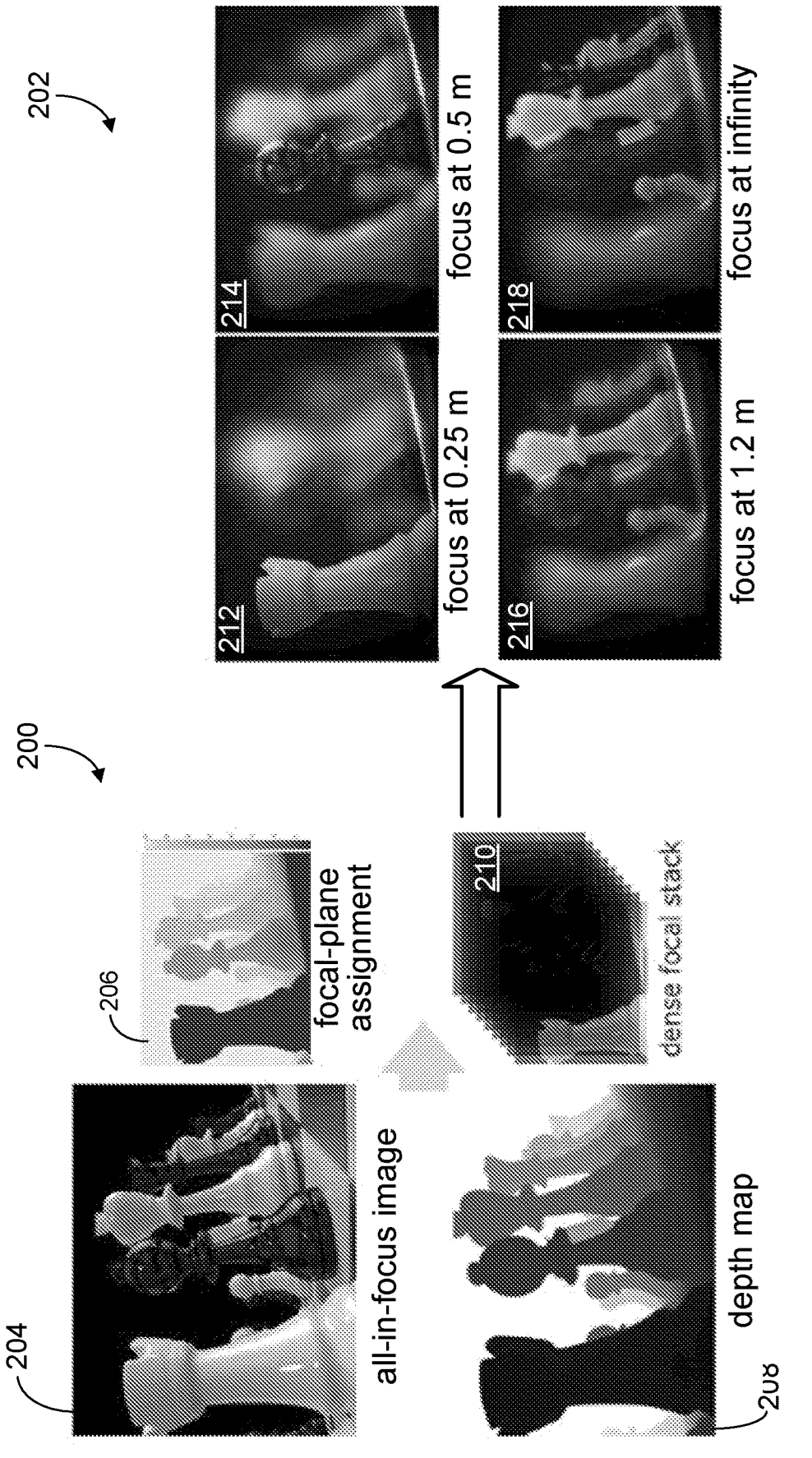
FIG. 2 shows example inputs and outputs for the display system.

Turning to FIG. 2, the display system 100 receives several example inputs 200 and produces example outputs 202 from the inputs. The display system 100 is configured to produce strong focusing cues for the human eye, which typically requires rendering scenes with dense focal stacks. This would require a virtual reality display that can produce thousands of focal planes per second. The display system 100 achieves this capability by exciting the focus-tunable lens with a high-frequency input and tracking its focal length at microsecond time resolution. The display system 100 is capable of generating 1600 focal planes per second, which we use to render 40 focal planes per frame at 40 frames per second. The images 212, 214, 216, 218 are captured with a 50 mm f/2.8 lens focused at different depths away from the tunable lens. Image 212 is captured at 25 cm, image 214 is captured at a focal length of 50 cm, image 216 is captured at a focal length of 1.2 m, and image 218 is captured at a focal length of infinity (e.g., no focusing by the optical element 102). Though images corresponding to four focal planes are show, other numbers of focal planes (e.g., 25 or more) can be included in the output.

The display system 100 receives several inputs to generate images 212, 214, 216, and 218. For example, the display system 100 receives an input image 204 to translate into images of varying focal planes for AR/VR applications. One or more pixels (generally, each pixel) of the image 204 is assigned a focal plane, as shown in image 206. The focal plane data can be generated by a computing module of the display system 100, (e.g., by the control system 114) based on one or more sensor readings. For example, a range sensor can capture depth data 208 for objects shown in the image (e.g., if the scene of the image 204 corresponds to a real-life scene captured by a camera). For example, a head mounted display (HMD) including the display system 100 can also include a camera to capture images 204 for displaying to the user. The HMD can also include the range sensor to capture range data for focal plane assignment. In some implementations, the focal plane assignment is received from another computing system along with the image 204. In some implementations, the focal plane assignment data 206 is generated from the image 204 without any other data being received.

Figures 3A, 3B, 3C:
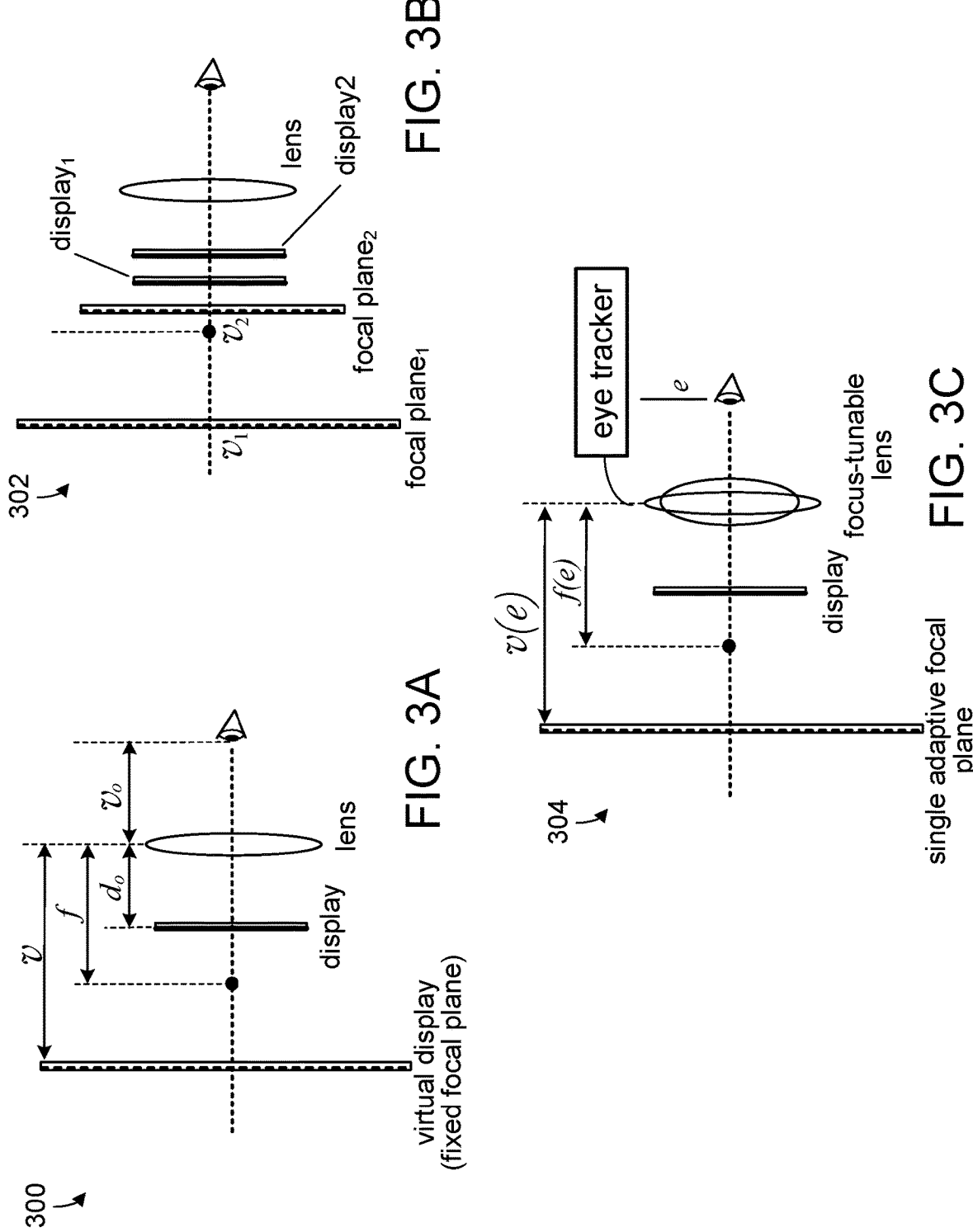
FIG. 3A-3C shows example configurations of display systems.

A typical VR display includes a convex eyepiece and a display. Turning to FIGS. 3A-3C, examples of typical configurations of VR displays are shown. As shown in FIG. 3A, a device 300 includes display which is placed within the focal length of the convex lens in order to create a magnified virtual image. The distance $v>0$ of the virtual image can be calculated by the thin lens formula:

$$\frac{1}{d_o} + \frac{1}{-v} = \frac{1}{f}, \tag{1}$$

where $d_o$ is the distance between the display and the lens, and f is the focal length.

$$\frac{1}{v}$$

is an affine function of the optical power (1/f) of the lens and the term $1/d_o$. By choosing $d_o$ and f, the designer can put the virtual image of the display at the desired depth. However, for many applications, most scenes need to be rendered across a wide range of depths. Due to the fixed focal plane, typical displays, such as display 300, do not provide natural accommodation cues.

Multifocal and varifocal displays control the depths of the focal planes by dynamically adjusting f or $d_o$ in equation 1. Multifocal displays aim to produce multiple focal planes at different depths for each frame. FIG. 3B shows a typical device 302. Varifocal displays support only one focal plane per frame whose depth is dynamically adjusted based on the gaze of the user's eyes. FIG. 3C shows a typical device 304. Multifocal and varifocal displays can be designed in many ways, including the use of multiple (transparent) displays placed at different depths, a translation stage to physically move a display or optics, deformable mirrors, as well as a focus-tunable lens to optically reposition a fixed display. Varifocal focal displays show a single focal plane at any point in time, but they require precise eye/gaze-tracking at low latency. Multifocal displays, on the other hand, have largely been limited to displaying a few focal planes per frame due to the limited switching speed of translation stages and focus-tunable lenses.

While multifocal and varifocal displays produce a collection of focal planes, light field displays aim to synthesize the light field of a 3D scene. In some implementations, angular information is introduced in some typical devices by replacing the eyepiece with a microlens array. In some implementations, multiple spatial light modulators are used to modulate the intensity of light rays. While these conventional displays fully support accommodation cues and produce natural defocus blur and parallax, they suffer from poor spatial resolution due to the space-angle resolution trade-off.

When virtual scenes are rendered with few focal planes, there are associated aliasing artifacts as well as a reduction of spatial resolution on content that is to be rendered in between focal planes. Such artifacts can be alleviated using linear depth filtering. However, linear depth filtering produces artifacts near object boundaries due to the inability of multifocal displays to occlude light. To produce proper occlusion cues with multifocal displays, the device can jointly optimize the contents shown on all focal planes. By modeling the defocus blur of focal planes when an eye is focused at certain depths, they formulate a non-negative least-square problem that minimizes the mean-squared error between perceived images and target images at multiple depths.

The number of focal planes for supporting a target accommodation range is chosen by the display system 100, either before operation or during operation. In order to be indistinguishable from the real world, a virtual world should enable human eyes to accommodate freely on arbitrary depths. In addition, the virtual world should have high spatial resolution anywhere within the target accommodation range. This requires generating light fields of high spatial and angular resolution. Displaying a dense focal stack as described in relation to FIG. 1 achieves the goal of generating virtual worlds that can handle the accommodation cues of the human eye.

To understand the capability of a multifocal display, the generated light field of the display system 100 is shown in the frequency domain. FIG. 4. shows Fourier transforms of a light field at each stage of the display system. This analysis focuses on the minimum number of focal planes required to retain spatial resolution within an accommodation range, as opposed to efficient rendering of foveated light fields. In FIG. 4, a Fourier transform of the 2-dimensional light field at each stage of a multifocal display, such as the display system 100. The display system 100 is assumed to be isotropic and has pixels of pitch $\Delta x$. Image 400 shows that each light ray in the light field is characterized by its intercepts with two parallel axes, x and u, which are separated by 1 unit, and the origin of the u-axis is relative to each individual value of x. Image 402 shows that, with no angular resolution, the light field spectrum emitted by the display is a flat line on $f_x$.

For FIG. 4, only on the central portion $$\left(|f_x| \le \frac{1}{2\Delta x}\right)$$

is shown tor the images 400-414. In image 404, the light field propagates $d_o$ to the tunable lens, causing the spectrum to shear along $f_u$. Image 406 shows refraction due to the lens corresponds to shearing along $f_x$, forming a line segment of slope $-\upsilon_i$, where $\upsilon_i$ is the depth of the focal plane. Images 408. 410 show refraction by the lens in a viewer's eye and propagation $d_e$ to the retina without considering the finite aperture of the pupil. Image 412 shows the spectrum of the pupil function propagates $d_e$ to the retina. Image 414 shows the light field spectrum on the retina with a finite aperture is the 2-dimensional cross-correlation between image 410 and image 412. According to Fourier slice theorem, the spectrum of the perceived image is the slice along $f_x$, shown as the red line. The diameter of the pupil and the slope of the line of image 410, which is determined by the focus of the eye and the virtual depth $\upsilon_i$, determine the spatial bandwidth, W, of the perceived image.

This analysis considers a flatland with two-dimensional light fields. In the flatland, the direction of a light ray is parameterized by its intercepts with two parallel axes, x and u, which are separated by 1 unit, and the origin of the u-axis is relative to each individual value of x such that u measures the tangent angle of a ray passing through x, as shown in image 400. The human eye is modeled with a camera composed of a finite-aperture lens and a sensor plane $d_e$ away from the lens, following several assumptions. For example, one assumption is that the pupil of the eye is located at the center of the focus-tunable lens and is smaller than the aperture of the tunable lens. Another assumption is that the display and the sensor emits and receives light isotropically. In other words, each pixel on the display uniformly emits light rays toward every direction and vice versa for the sensor. Another assumption is small-angle (paraxial) scenarios, since the distance $d_o$ and the focal length of the tunable lens (or essentially, the depths of focal planes) are large compared to the diameter of the pupil. This assumption simplifies analysis by allowing consideration of each pixel in isolation.

Since the display is assumed to emit light isotropically in angle, the light field created by a display pixel can be modeled as $$\ell_d(x, u) = I\delta(x)^* rect\left(\frac{x}{\Delta x}\right),$$

where I is the radiance emitted by the pixel, * represents two-dimensional convolution, and $\Delta x$ is the pitch of the display pixel. The Fourier transform of $l_d$ (x,u) is $$L_d(f_x, f_u) = \frac{I}{\Delta x} sinc(\Delta x f_x),$$

which lies on the $f_x$ axis, as shown in images 402. Only the central lobe of $\sin c(\Delta x\ f_x)$ corresponding to $$|f_x| \le \frac{1}{2\Delta x}$$

is plotted, since this is sufficient for calculation of the half-maximum bandwidth of retinal images. In the following, we omit the constant $$\frac{1}{\Delta x}$$

for brevity.

The optical path from the display module 104 to the retina (sensor) is decomposed to examine its effects in the frequency domain. After leaving the display, the light field propagates a distance $d_o$, gets refracted by the tunable lens, and by the lens of the eye where it is partially blocked by the pupil, whose diameter is a, and propagates a distance $d_e$ to the retina where it finally gets integrated across angle. Propagation and refraction shears the spectrum of the light field along $f_u$ and $f_x$, respectively, as shown in images 404, 406, and 408. Before entering the pupil, the focal plane at depth $\upsilon_i$ forms a segment of slope $-\upsilon_i$ within $$|f_x| \le \frac{d_o}{2\upsilon_i \Delta x}$$

where $$\frac{d_o}{\upsilon_i}$$

is due to the magnification of the lens. For brevity, we show only the final (and most important) step and defer the full derivation to the next section. Suppose the eye focuses at depth $v=f_e d_e/(d_e-f_e)$, and the focus-tunable lens configuration creates a focal plane at $v_i$. The Fourier transform of the light field reaching the retina is $$L_e(f_x f_u) = L^{(\upsilon_i)}(f_x f_u) \circledast A^{(d_e)}(f_x f_u), \tag{2}$$

where $\circledast$ represents two-dimensional cross correlation, $L(v_i)$ is the Fourier transform of the light field from the focal plane at $v_i$ reaching the retina without aperture as shown in image 410, and $A^{(d_e)}$ is the Fourier transform of the aperture function propagated to the retina, shown in image 412. Depending on the virtual depth $v_i$, the cross correlation creates different extent of blur on the spectrum, shown in image 414. Finally, the Fourier transform of the image that is seen by the eye is simply the slice along $f_x$ on $L_e$.

When the eye focuses at the focal plane ($v=v_i$), the spectrum lies entirely on $f_x$ and the cross correlation with $A^{(d_e)}$ has no effect on the spectrum along $f_x$. The resulted retinal image has maximum spatial resolution $$\frac{d_o}{2d_e\Delta x}$$

which is independent of the depth of the focal plane $v_i$.

When the eye is not focused on the virtual depth plane, i.e., $v_i \neq v$, the cross correlation results in a segment of width $$W = \frac{1}{2ad_e}\left(\left|\frac{1}{v} - \frac{1}{v_i}\right|\right)^{-1}$$

on the $f_x$-axis, shown in image 414. Note that $|L_e(\pm W, 0)| = \sin c(0.5) \times \sin c(0.5) \approx 0.4$, and thereby the half-maximum bandwidth of the spatial frequency of the perceived image is upper-bounded by W.

A more detailed derivation is now presented. Provided are the analytical expressions for the perceived spatial resolution (e.g., equation 3, below) and the minimum number of focal planes required (e.g., equation 5, below). The optical path from the display to the retina (sensor) is decomposed to examine the effect in frequency domain due to each component. Due to the finite pixel pitch, the light field creates by the display can be modeled as:

$$\ell_d(x, u) = \left(rect\left(\frac{x}{\Delta x}\right) * \ell_t(x, u = 0)\right) \times \sum_{m=-\infty}^{\infty} \delta(-m\Delta x)$$

where * represents two-dimensional convolution, $\Delta x$ is the pitch of the display pixel, and $l_t$ is the target light field. The Fourier transform of $l_d$ (x,u) is:

$$L_d(f_x, f_u) = (sinc(\Delta x f_x)\delta(f_u)L_t(f_x, f_u)) * \sum_{m=-\infty}^{\infty} \delta\left(f_x - \frac{m}{\Delta x}\right).$$

The finite pixel pitch acts as an anti-aliasing filter and thus we consider only the central spectrum replica (m=0). Also, we assume $$|L_t(f_x, f_u)| = 0 \text{ for all } |f_x| \geq \frac{1}{2\Delta x}$$

to avoid aliasing. Since the light field is nonnegative, or $\ell_d \geq 0$, we have $|L_t (f_x, f_u)| \leq L_t (0, 0)$. Therefore, it is shown that:

$$|L_d(f_x, f_u)| \leq L_t(0, 0)|sinc(\Delta x f_x)|\delta(f_u), \quad |f_x| \leq \frac{1}{2\Delta x} \quad (11)$$

$$|L_d(f_x, f_u)| = 0, \quad \text{otherwise.} \quad (12)$$

Therefore, in the ensuing derivation, we will focus on the upper-bound:

$$\hat{L}_d = sinc(\Delta x f_x)\delta(f_u)rect\left(\frac{f_x}{\Delta x}\right)$$

The light field spectrum $L_d$ forms a line segment parallel to $f_x$, as plotted in image 400.

The propagation to the eye of the light field is now described. After leaving the display, the light field propagates $d_o$ and get refracted by the focus-tunable lens before reaching the eye. Under first-order optics, there operations can be modeled by coordinate transformation of the light fields. Let $x=[x \ u]^T$. After propagating a distance $d_o$, the output light field is a reparameterization of the input light field and can be represented as $$\ell_o(x) = \ell_i(P_{d_o}^{-1}x), \text{ where } P_{d_o} = \begin{bmatrix} 1 & d_o \\ 0 & 1 \end{bmatrix}$$

After refracted by a thin lens with focal length f, the output light field right after the lens is:

$$\ell_o(x) = \ell_i(R_f^{-1}x), \text{ where } R_f = \begin{bmatrix} 1 & 0 \\ \dfrac{-1}{f} & 1 \end{bmatrix}$$

Since $P_{do}$ and $R_f$ are invertible, the stretch theorem of d-dimensional Fourier transform is used to analyze their effect in the frequency domain. The general stretch theorem states that: Let $x \in \mathbb{R}^d$, $\mathcal{F}(\cdot)$ be the Fourier transform operator, and $A \in \mathbb{R}^{d \times d}$ be any invertible matrix. It is shown that:

$$\mathcal{F}(\ell(Ax)) = \frac{1}{|\det A|}L(A^{-T}f),$$

where L is the Fourier transform of l, $f \in \mathbb{R}^d$ is the variable in frequency domain, det A represents determinant of A, and $A^{-T}=(A^T)^{-1}=(A^{-1})^T$. By applying the stretch theorem to $P_{do}$ and $R_f$, we can see that propagation and refraction shears the Fourier transform of the light field along $f_u$ and $f_x$, respectively, as shown in images 402, 404, 406.

After reaching the eye, the light field to is partially blocked by the pupil, refracted by the lens of the eye, propagates $d_e$ to the retina, and finally integrated through all directions to form an image. The light field reaching the retina can be represented as $$\ell_e(x) = \ell_a(R_{f_e}^{-1}P_{d_e}^{-1}x), \text{ where } \ell_a(x) = rect\left(\frac{x}{a}\right)\ell_o(x)$$

and a is the diameter of the pupil. To understand the effect of the aperture, a more general situation is analyzed in which the light field is multiplied with a general function h(x) and transformed by an invertible T with unit determinant. By multiplication theorem, it is shown that:

$$\ell_a(x) = h(x) \times \ell_o(x) \xrightarrow{\mathcal{F}} L_a(f) = H(f) * L_o(f). \quad (13)$$

Thereby, $$L_a(Tf) = \int L_o(p)H(p - Tf)\,dp = \int L_o(p)H\left(T(T^{-1}p - f)\right)dp = \int L_o(T(q + f))H(Tq)\left|\frac{\partial p}{\partial q}\right|dq = L_o^{(T)} \otimes H^{(T)}(f),$$

holds because $|\delta_p/\delta_q|=\det T=1$. Equation 13 relates the effect of the aperture directly to the output light field at the retina. The spectrum of the output light field is the cross correlation between the transformed (refracted and propagated) input spectrum with full aperture and the transformed spectrum of the aperture function. The result significantly simplifies this analysis, and as a result, enables derivation of an analytical expression of spatial resolution and number of focal planes needed. In this scenario, we have:

$$T=(R_{f_e}^{-1}P_{d_e}^{-1})^{-T}.$$

For a virtual display at $v_i$, $\ell(x)$ is a line segment of slope $-v_i$ within $$x \in \left[\frac{-1}{2\Delta x_i}, \frac{1}{2\Delta x_i}\right], \text{ where } \Delta x_i = \left|\frac{v_i}{d}\right|.$$

$\Delta x$ is the magnified pixel pitch. According to Equation 13, $L_e$ (f)=$L_a$ (Tf) is the cross correlation of $L_o$ (Tf) and sin c(Tf). After transformation, $L_a$ (Tf) is a line segment of slope $$\frac{d_e v_i - (d_e + v_i)f_e}{v_i - f_e} \text{ where } |x| \le \left|\left(\frac{v_i}{f_e} - 1\right)\frac{1}{\Delta x_i}\right|.$$

Similarly, sin c(Tf) is a line segment with slope $-d_e$ within $$|x| \le \frac{1}{2a}.$$

Note that we only consider $$|x| \le \frac{1}{2a}$$

because the cross-correlation result at the boundary has value sin c(0.5)×sin c(0.5)≈0.4. Since sin c(x) function is monotonically decreasing for $|x|\le1$, the half-maximum spectral bandwidth ($|L_e$ (f)|=0.5) must be within the region. Let the depth the eye is focusing at be v. It is shown that:

$$\frac{1}{v} + \frac{1}{d_e} = \frac{1}{f_e}.$$

When $v=v_i$, it is shown from the above expression that $L_a$ (Tf) is a flat segment within $$|fx| \le \frac{1}{2M\Delta x},$$

where $M=d_e/d_o$ is the overall magnification caused by the focus-tunable lens and the lens of the eye. From Fourier slice theorem, it is shown that the spectrum of the image is the slice $L_a$ (Tf) along $f_x$. In this case, the aperture has no effect to the final image, since the cross correlation does not extend or reduce the spectrum along $f_x$, and the final image has the highest spatial resolution $$\frac{1}{2M\Delta x}.$$

Suppose the eye does not focus on the virtual display, or $v\approx v_i$. In the case of a full aperture (a→∞), the resulted image will be a constant DC term (completely blurred) because the slice along $f_x$ is a delta function at $f_x$=0. In the case of finite aperture diameter a, with a simple geometric derivation, shown in image 414, it is shown by geometry that the bandwidth of the $f_x$-slice of $L_e$(f), or equivalently, the region $\{f_x|L_e$ ($f_x$, 0)≥0.5$\}$, is bounded by $|f_x|\le$W. Therefore:

$$W = \begin{cases} \dfrac{d_o}{2\Delta x d_e}, & \text{if } \left|\dfrac{1}{v_i} - \dfrac{1}{v}\right| \le \dfrac{\Delta x}{a d_o} \\ \dfrac{1}{2a d_e}\left|\dfrac{1}{v} - \dfrac{1}{v_i}\right|^{-1}, & \text{otherwise.} \end{cases} \tag{14}$$

Thereby, based on Fourier slice theorem, the bandwidth of the retina images is bounded by W.

The spatial resolution of a multifocal display can be characterized based on the derivation provided above. Suppose the eye can accommodate freely on any depth v within a target accommodation range, $[v_a, v_b]$. Let V=$\{v_1=v_a, v2, \ldots, v_n=v_b\}$ be the set of depth of the focal planes created by the multifocal display. When the eye focuses at v, the image formed on its retina has spatial resolution of:

$$F_s(v) = \min\left\{\frac{d_o}{2d_e\Delta x}, \max_{v_i\in V}\left(2ad_e\left|\frac{1}{v} - \frac{1}{v_i}\right|\right)^{-1}\right\}. \tag{3}$$

where the first term characterizes the inherent spatial resolution of the display unit, and the second term characterizes spatial resolution limited by accommodation, i.e. potential mismatch between the focus plane of the eye and the display. This bound on spatial resolution is a physical constraint caused by the finite display pixel pitch and the limiting aperture (i.e., the pupil)—even if the retina had infinitely-high spatial sampling rate. Any post-processing methods including linear depth filtering, optimization-based filtering, and nonlinear deconvolution cannot surpass this limitation.

As can be seen in equation 3, the maximum spacing between any two focal planes in diopter determines min $v\in[v_a, v_b]F_s$ (v), the lowest perceived spatial resolution within the accommodation range. If a multifocal display for display system 100 is desired with spatial resolution across the accommodation range to be at least F, $$F \le \frac{d_o}{2d_e\Delta x},$$

the best we can do with n focal planes is to have a constant inter-focal separation in diopter. This results in an inequality that $$\left(\frac{2ad_e}{2n}\left(\frac{1}{v_a} - \frac{1}{v_b}\right)\right)^{-1} \ge F. \tag{4}$$

Or equivalently, $$n \geq ad_e\left(\frac{1}{v_a} - \frac{1}{v_b}\right)F. \quad (5)$$

Increasing the number of focal planes n (and distributing them uniformly in diopter) is thereby required for multifocal displays to support higher spatial resolution and wider accommodation range.

At the other extreme, if there are a sufficient number of focal planes, the limiting factor becomes the pixel pitch of the display unit. In this scenario, for a focal plane at virtual depth vi, the retinal image of an eye focuses on v will have maximal spatial resolution ii $$\frac{d_o}{d_e \Delta x}$$

$$\left|\frac{1}{v} - \frac{1}{v_i}\right| \leq \frac{\Delta x}{ad_o}.$$

In other words, the depth-of-field of a focal plane, which is defined as the depth range that under focus provides the maximum resolution, is $$\frac{2\Delta x}{ad_o}$$

diopters. Since the maximum accommodation range of the multifocal display with a convex tunable lens is $$\frac{1}{d_o}$$

diopter, at least $$\frac{a}{2\Delta x}$$

focal planes to achieve the maximum spatial resolution of the multifocal display across the maximum supported depth range, or $$\frac{D_o ad_o}{2\Delta x}$$

focal planes for a depth range of $D_i$. For example, if the display system 100 includes $\Delta x$=13.6 um, $d_o$=7 cm, and pupil diameter a=4 mm, the display system 100 would include 147 focal planes for the maximum possible depth range of $d_o$=7 cm to infinity or $D_o$=14.3 diopters to reach the resolution upper-bound. For a shorter working range of 25 cm to infinity, or 4 diopters, the display system 100 includes 41 focal planes.

For the display system 100 does not need to wait for the optical element 102 (e.g., a focus-tunable lens) to settle at a particular focal length. Instead, if the display system 100 constantly drives the lens so that it sweeps across a range of focal lengths, and, in some implementations, subsequently tracks the focal length in real time, the display system 100 can display the corresponding focal plane without waiting for the focus-tunable lens to settle. This enables the display system 100 to display as many focal planes as desired, as long as the display module 104 supports the required frame rate.

In some implementations, the optical power of the optical element 102 (e.g., a focus-tunable lens) is controlled by an input voltage or current. However, simply measuring these values generally provides inaccurate and biased estimates of the focal length. This is due to the time-varying transfer functions of most tunable lenses, which are known to be sensitive to operating temperature and irregular motor delays. Instead, the control system 114 is configured to estimate the focal length by probing the tunable lens optically. This enables robust estimations that are invulnerable to the unexpected factors.

Figure 5A:
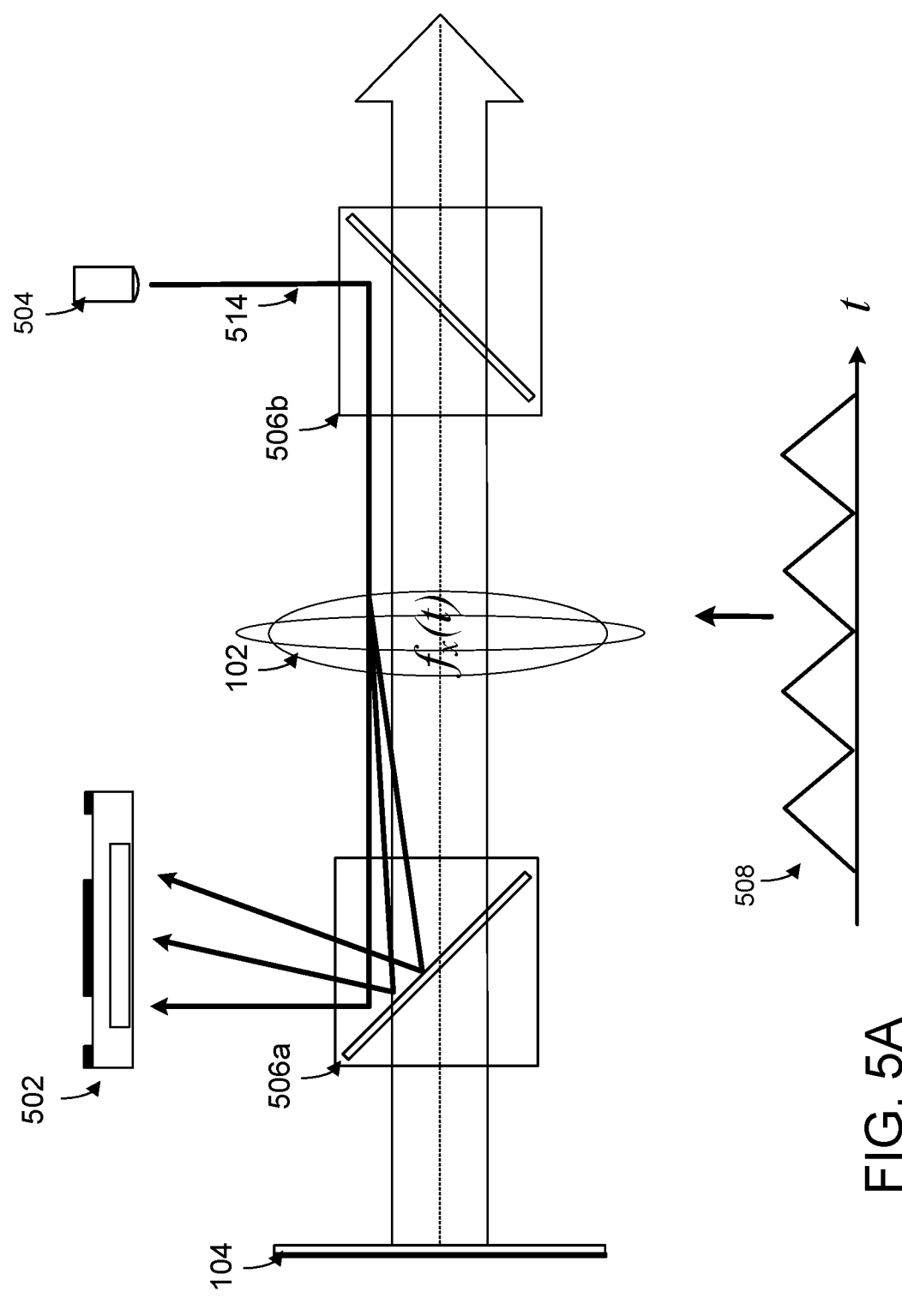
FIG. 5A shows an example of the display system of FIG. 1 with an example focal length tracking module.

FIG. 5A shows an example of the display system 100 of FIG. 1 with an example 500 of the focal length tracking module 108. The focal length tracking module 108 configured to monitor variations of the focal length of the optical element and provide feedback to the control system. In some implementations, the focal length tracking module includes a light emitting device configured to emit a beam of light through the optical element; and a light-sensitive sensor configured to detect a deflection of the beam of light through the optical element, wherein an amount of the deflection of the beam of light is a function of the focal length of the optical element.

In some implementations, the focal length tracking module 500 of FIG. 5A includes two short-pass dichroic mirrors 506a, 506b and a position sensing detector 502. The dichroic mirror 506 allows visible light to pass through but reflects the infrared light ray 514 emitted from the collimated laser 504. The optical element 102 is driven by a signal 508. In some implementations, the signal 508 is a triangle signal configured to cause the optical element 102 to sweep though the range of focal lengths from a minimum up to a maximum and back down to the minimum. This ensures that all focal planes of the focal plane stack 106 can be displayed. The display module 104 displays the corresponding image frame for each focal plane of the focal plane stack 106.

The sensing detector 502 is configured detect the focal length of the optical element 102 in real time by measuring the deflection of the beam 514 by the optical element. This feedback thus takes into account any environmental factors that may be distorting the optical element 102, and complex transfer functions for estimating environmental effects are not required.

In some implementations, the focal length tracking module 108 comprises a light emitting device configured to illuminate the optical element to generate an optical wavefront. The focal length tracking module 108 includes a light sensitive device configured to receive the optical wavefront from the optical element and determine a curvature of the optical element.

Figure 5B:
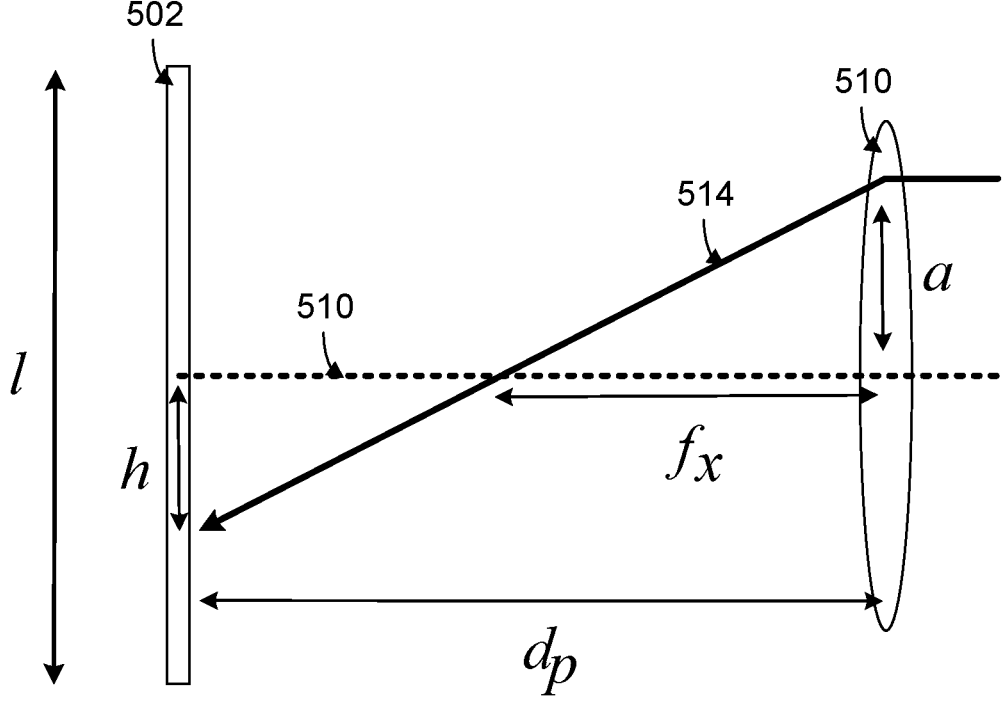
FIG. 5B shows an optical layout of the focal length tracking module of FIG. 5A.

FIG. 5B shows a close up view of the position detector 502. The position of the beam 514 on the position sensing detector 502 is an affine function of the optical power of the optical element 102 (in this example, a focus-tunable lens).

To measure the focal length, the focal length tracking module 108 is configured to cause a collimated infrared laser beam 514 to be sent through the edge of the focus-tunable lens 510. Because the direction of the outgoing beam depends on the focal length, the laser beam 514 changes direction as the focal length changes. There are many approaches to measure this change in direction, including using a one-dimensional pixel array or an encoder system. For example, a one-dimensional position sensing detector (PSD) enables fast and accurate measurement of the location.

The focal length of the focus-tunable lens 510 is estimated from the beam 514 position on the detector 502 as follows. The laser is aligned so that it is parallel to the optical axis of the focus-tunable lens 510. After deflection by the lens 510, the beam 514 is incident on a spot on the PSD whose position is given as $$h = a\left(\frac{d_p}{f_x} - 1\right), \tag{6}$$

where $f_x$ is the focal length of the lens, $d_p$ is the distance measured along the optical axis between the lens and the PSD 502, and h is the distance between the optical center of the lens and the spot the laser is incident on. Note that the displacement h is an affine function of the optical power of the focus-tunable lens.

The location of the spot is estimated from the PSD outputs. In some implementations, the PSD 502 is composed of a photodiode and a resistor distributed throughout the active area. The photodiode has two connectors at its anode and a common cathode. Suppose the total length of the active area of the PSD 502 is f. When a light ray reaches a point at h on the PSD 502, the generated photocurrent will flow from each anode connector to the cathode with amount inversely proportional to the resistance in between. Since resistance is proportional to length, we have the ratio of the currents in the anode and cathode as $$\frac{i_1}{i_2} = \frac{R_2}{R_1} = \frac{\frac{\ell}{2} - h}{\frac{\ell}{2} + h}, \text{ or } h = \frac{\ell}{2} \frac{i_2 - i_1}{i_2 + i_1}. \tag{7}$$

Combining (7) and (6), it is shown that:

$$\frac{1}{f_x} = \frac{\ell}{2ad_p} r + \frac{1}{d_p}, \text{ where } r = \frac{i_2 - i_1}{i_2 + i_1}. \tag{8}$$

As can be seen, the optical power of the tunable lens $1/f_x$ is an affine function of r. With simple calibration (to get the two coefficients), we can easily estimate the value.

In order to display multiple focal planes within one frame, the display system 100 includes a display that has a frame rate greater than or equal to the focal-plane display rate. In some implementations, the display module 104 includes a digital micromirror device (DMD)-based projector. Commercially available DMDs can easily achieve upwards of 20,000 bitplanes per second. The control system 114 is configured to modulate the intensity of the projector's light source to display 8-bit images. This enables the display module 104 to display each focal plane with 8-bits of intensity and generate as many as 20,000/8≈2,500 focal planes per second.

The display system 100 is capable of supporting the full accommodation range of typical human eyes (e.g., generate focal planes from 25 cm to infinity). Suppose the optical power of the focus-tunable lens ranges from $D_1=1/f_1$ to $D_2=1/f_2$ diopter. From equation (1), it is shown that:

$$\frac{1}{-v(t)} = \frac{1}{f_x(t)} - \frac{1}{d_o} = -\left(\frac{1}{d_o} - D_x(t)\right). \tag{9}$$

where $d_o$ is the distance between the display unit and the tunable lens, $v(t)$ is the distance of the virtual image of the display unit from the lens, $f_x(t) \in [f_2, f_1]$ is the focal length of the lens at time t, and $D_x(t)=1/f_x(t)$ is the optical power of the lens in diopter. Because the display system 100 should have $v(t)$ to range from 25 cm to infinity, $1/v(t)$ ranges from 4 m$^{-1}$ to 0 m$^{-1}$. Thereby, $$4 - D_1 \le \frac{1}{d_o} \le D_2.$$

An immediate implication of this is that $D_2-D_1 \ge 4$. In other words, to support the full accommodation range of a human eye, the display system 100 includes an optical element 102 which has an optical power that spans at least 4 diopters. There is more choice over the actual range of focal lengths taken by the optical element 102. A simple choice is to set $1/f_2=D_2=1/d_o$, which ensures that the display system 100 can render focal planes at infinity. Subsequently, the display system 100 is configured to include an $f_1$ value sufficiently large to cover 4 diopters. By choosing a small value of $f_2$, the display system 100 can have a small do and thereby achieve a compact display.

The display system 100 shares the same field-of-view and eye box characteristics with other multifocal displays. The field-of-view will be maximized when the eye is located right near the optical element 102. This results in a field-of-view of 2 a tan(H/2$d_o$), where H is the height (or width) of the physical display (or its magnification image via lensing). When the eye is further away from the lens, the numerical aperture will limit the extent of the field-of-view. Because the apertures of most tunable lenses are small (around 1 cm in diameter), the display system 100 is configured to allow the eye as close as the optical element 102 as possible. This can be achieved by embedding the dichroic mirror 506a onto the rim of the optical element 102 (e.g., focus-tunable lens 510). In some implementations, the display system 100, includes a 4f system to relay the eye to the aperture of the focus-tunable lens 510. The choice of the 4f system enables a 45-degree field-of-view, limited by the numerical aperture of the lens in the 4f system.

There are alternate implementations of focus tunable lenses that have the potential for providing larger apertures and hence, displays with larger field of views. For example, the optical element 102 can include two phase plates that produce the phase function of a lens whose focal length is determined by the relative orientation of the plates. In this example, the display system 100 obtains a large aperture focus tunable lens by rotating one of the phase plates. In some implementations, the optical element 102 includes the Fresnel and Pancharatnam-Berry liquid crystal lenses to enable large-aperture tunable lensing. In some implementations, the optical element 102 includes tunable metasurface doublets. The focal length tracking module 108 can be combined with any of these examples to provide precise estimates of the focal length of the optical element 102.

The eye box of multifocal displays are often small, and the display system 100 is no exception. Due to the depth difference of focal planes, as the eye shifts, contents on each focal plane shift by different amounts, with the closer ones traverse more than the farther ones. This will leave uncovered as well as overlapping regions at depth discontinuities. Further, the severity of the artifacts depends largely on the specific content being displayed. In practice, these artifacts are not distracting for small eye movements in the order of few millimeters. In some implementations, this problem is solved by incorporating an eye tracker (not shown) into the display system 100.

The maximum brightness and, depending on the implementation, the energy efficiency of the display system 100 are described. Suppose we are displaying n focal planes per frame and T frames per second. Each focal plane is displayed for T/n second, which is n-times smaller compared to typical VR displays with one focal plane. In some implementations, the display system 100 includes a high power LED to compensate for the reduction in brightness. Generally, brightness of the display is not a primary concern since there are no competing ambient lights sources for VR displays.

The energy efficiency of the display system 100 depends on the type of display module 104 included. In some implementations, when the display system 100 includes a DMD display module 104 to spatially modulate the intensity at each pixel, $$\frac{n-1}{n}$$

of the energy is wasted. To avoid this waste, in some implementations, the display system 100 includes OLED displays, where a pixel can be completely turned off. Another solution is for the display module 104 to include a phase spatial light modulator (SLM) to spatially redistribute a light source so that each focal plane only gets illuminated at pixels that need to be displayed. Another option is to include in the display system 100 a laser along with a 2D galvo to selectively illuminate the content at each depth plane.

A particular example of the display system 100 is described. In some implementations, the display system 100 is composed of three functional blocks: a focus-tunable lens for the optical element 102, the focal length tracking module 108, and a display module 104 including a DMD-based projector. In some implementations, the control system 114 includes an FPGA (Altera DEO-nano-SOC). The FPGA drives the tunable lens with a digital-to-analog converter (DAC), following algorithm 1 (shown below).

---

ALGORITHM 1
Tunable-lens and focal-plane control

Data: n target PSD triggers r₁,..., rₙ
Input: PSD ADC reading r
Output: Tunable-lens DAC level L, projector display control signal
Initialize L = 0, ΔL = 1, i = 1
repeat
|　　L ← L + ΔL
|　　if |r − r$_i$| ≤ Δr then
|　　|　　Display focal plane i and turn it off when finished.
|　　|　　i ← i + ΔL

---

---

ALGORITHM 1
Tunable-lens and focal-plane control

|　　|　　if ΔL == 1 and i > n then
|　　|　　|　　Change triangle direction to down: ΔL ← −1, i ← n
|　　|　　else if ΔL == −1 and i < 1 then
|　　|　　|　　Change triangle direction to up:　ΔL ← +1, i ← 1
|　　end
until manual stop;

---

The FPGA reads the focal-length tracking output with an analog-to-digital converter (ADC) and uses the value to trigger the projector to display the next focal plane. Every time a focal plane has been displayed, the projector is immediately turned off to avoid blur caused by the continuously changing focal-length configurations.

To display focal planes at correct depths, the control system 114 receives the corresponding PSD tracking outputs. From equations (8) and (9), it is shown that $$\frac{1}{v(t)} = \frac{1}{d_o} - \frac{1}{d_p} - \frac{\ell}{2ad_p}r(t) = a + \beta r(t). \quad (10)$$

Thereby, the control system 114 estimates the current depth v(t) in response to determining α and β, which can be estimated after only two measurements. With a camera focused at $v_a$=25 cm and $v_b$=∞, the control system 114 receives the two corresponding ADC readings $r_a$ and $r_b$. The two points can be accurately measured, because the depth-of-field of the camera at 25 cm is very small, and infinity can be approximated as long as the image is far away. Because equation (10) has an affine relationship, [$r_a$, $r_b$] are divided evenly into the desired number of focal planes.

The FPGA follows algorithm 1 to coordinate the tunable lens and the projector. In some implementations, the control system 114 drives the optical element 102 with a triangular wave by continuously increasing/decreasing the DAC levels. The control system 114 detects the PSD's DAC reading r to trigger the projection of focal planes. When the last/first focal plane is displayed, the control system 114 switches the direction of the waveform. Note that while algorithm 1 is written in serial form, every module in the FPGA runs in parallel.

The control algorithm is simple yet robust. The transfer function of the optical element 102 is sensitive to many factors, including device temperature and unexpected motor delay and errors. Generally, even with the same input waveform, the control system 114 can observe different offsets and peak-to-peak values on the PSD output waveform for each period. Because the algorithm does not drive the optical element 102 with fixed DAC values and instead directly detects the PSD output (e.g., the focal length of the tunable lens 510), the control system 114 can accommodate these factors. However, due to the motor delay, the peak-to-peak value $r_{max}$−$r_{min}$ can be larger than $r_n$−$r_1$. In some implementations, this can cause the frame rate of the prototype (1600 focal planes per second, or 40 focal planes per frame at 40 fps) to be lower than the highest display frame rate (2500 focal planes per second).

Because 40 fps is close to the persistence of vision, framerates near this speed can sometimes lead to flickering. However, the display system 100 can achieve a higher frame rate by trading off the focal planes per frame. For example, we can achieve 60 fps by operating at 26 focal planes per frame.

In some implementations, the optical element 102 includes a focus-tunable lens EL-10-30 from Optotune. The optical power of the lens ranges from approximately 8.3 to 20 diopters and is an affine function of the driving current input from 0 to 300 mA. The display system 100 can include a 12-bit DAC (MCP4725) with a current buffer (BUF634) to drive the optical element 102. The DAC provides 200 thousand samples per second, and the current buffer has a bandwidth of 30 MHz. The control system 114 can thus faithfully create a triangular input voltage up to several hundred Hertz.

Figure 6:
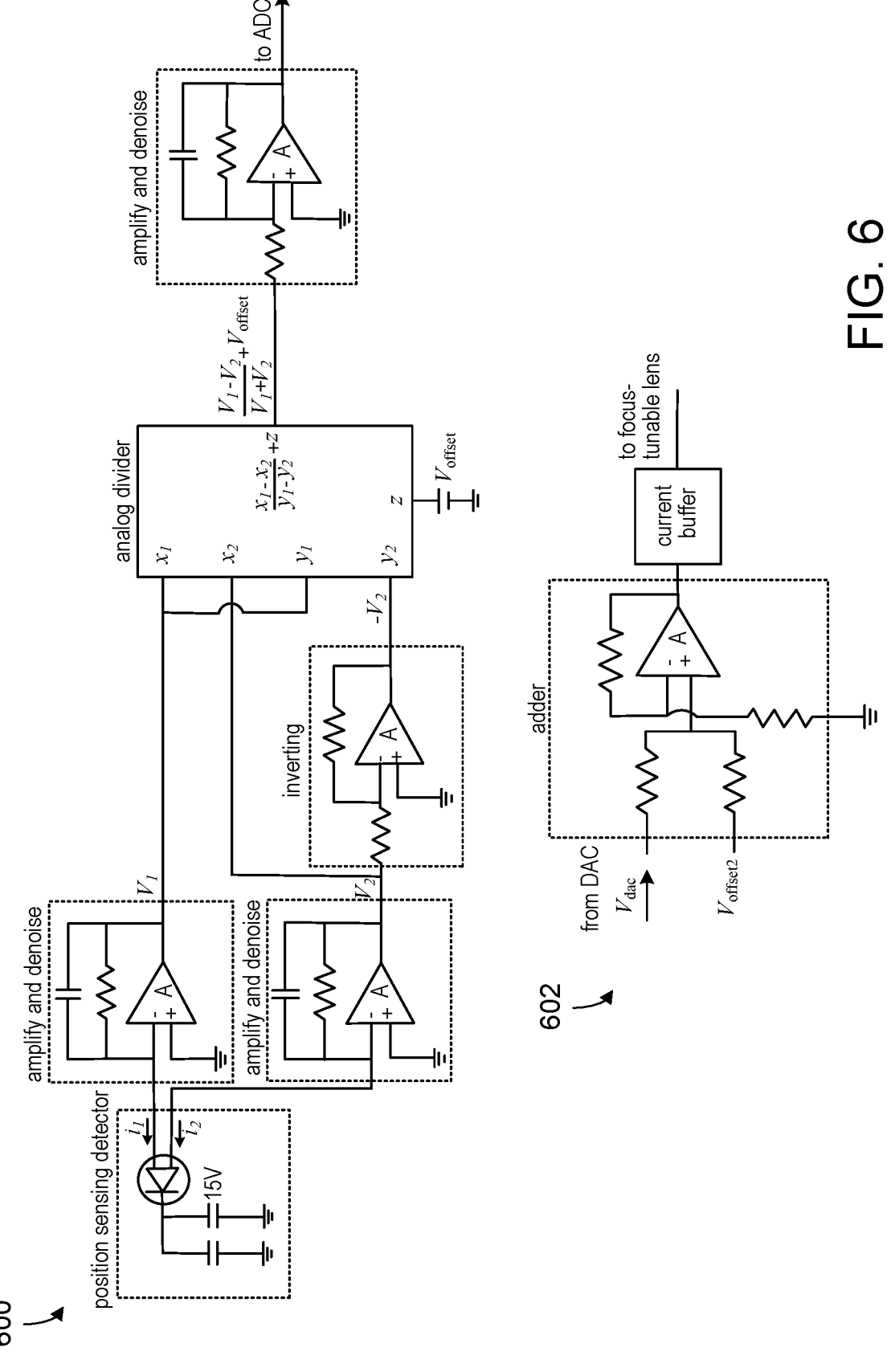
FIG. 6 shows example circuits for processing the output of the focal length tracking module of FIGS. 5A-5B and for driving the optical element of the display system.

FIG. 6 shows examples of analog circuits used in display system 100. The operational amplifiers are TI OPA-37, the analog divider is TI MPY634, and the current buffer is TI BUF634. Denoising RC circuits have cutoff frequency at 47.7 kHz.

Circuit 600 is configured for focal-length tracking and processing. In some implementations, the focal-length tracking device is composed of a one-dimensional PSD (SL15 from OSI Optoelectronics), two 800 nm dichroic short-pass mirrors (Edmundoptics #69-220), and a 980 nm collimated infrared laser (Thorlabs CPS980S). The PSD 502 can be driven with a reverse bias voltage of 15 V. This results in 15 um precision on the PSD surface and rise time of 0.6 us. Across the designed accommodation range, the laser spot traverses within 7 mm on the PSD surface, which has a total length 15 mm. This enables the control system 114 to accurately differentiate up to 466 focal-length configurations.

In some implementations, the analog processing circuit has three stages, including an amplifier, analog calculation, and an ADC, as shown in circuit 600. In some implementations, the display system 100 includes two operational amplifiers (TI OPA-37) to amplify the two output current of the PSD 502. In some implementations, the gain-bandwidth of the amplifiers are 45 MHz, which can fully support the desired operating speeds. A low-pass filter with a cut-off frequency of 47.7 kHz is included at the amplifier as a denoising filter. The computation of r(t) is conducted by the control system 114 with two operational amplifiers (TI OPA-37) and an analog divider (TI MPY634). A 12-bit ADC (LTC2308) with a rate of 200 thousand samples per second is used to port the analog voltage to the FPGA.

In some implementations, the latency of the focal-length tracking circuit is ~20 us. The bottleneck is the low-pass filter and the ADC, and the rest of the components have time responses in nanoseconds. In 20 us the focal length of the tunable lens changes by 0.01 diopters, which is well below the detection capabilities of the eye. Also, the stability of the acquired focal stack indicates that the latency was either minimal or at least predictable and can be dealt with by calibration during experimentation.

In some implementations, the display module 104 includes a DMD projector. The projector is composed of a DLP-7000 DMD from Texas Instruments, projection optics from Vialux, and a high-power LED XHP35A from Cree. The DMD can be controlled with a development module Vialux V-7000. The configuration of micro-minors can be updated every 50 us. In some implementations, the control system 114 uses pulse-width modulation, performed through a LED driver (TI LM3409HV), to change the intensity of the LED concurrently with the update of micro-minors. Thus, the display can reach 2500 8-bit images per second.

Figure 7:
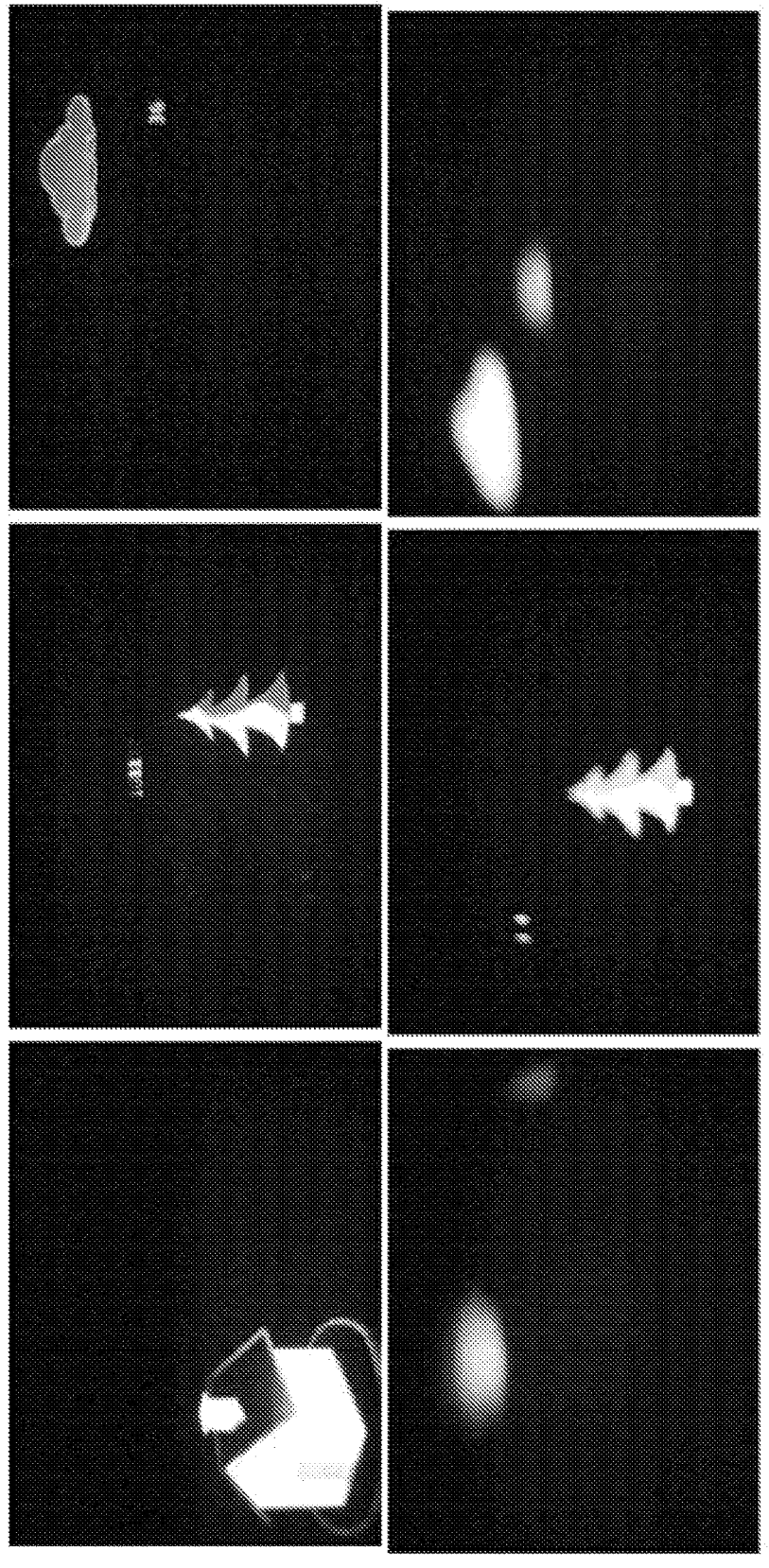
FIG. 7 shows examples of images captured from the display system.

FIG. 7 shows examples of images 700 captured from the display system 100. The images 700 were captured in burst shooting mode with a f/4 lens, exposure time equal to 0.5 ms, and ISO equal to 12,800. To capture a single focal plane, an exposure time of 0.2 modeling system 28 is needed. Thereby, these images are composed of at most 3 focal planes.

In one example, each focal stack includes 40×8=320 bitplanes, the display system 100 is preloaded with up to 136 focal stacks. Video-streaming can be performed by using a customized display controller that is capable of displaying bitplanes with 80 us latency. This would enable the display system 100 to display 1562 8-bit focal planes per second. Whether we use depth filtering or not, the transmitted bitplanes are sparse since each pixel has content, at best, at a few depth planes. Thereby, the display system 100 does not need to transmit the entire 320 bitplanes. The 8 bitplanes of each focal plane are divided into two groups of 4 bitplanes, and the first group are displayed when the triangular waveform is increasing, and the other at the downward waveform.

Figure 8:
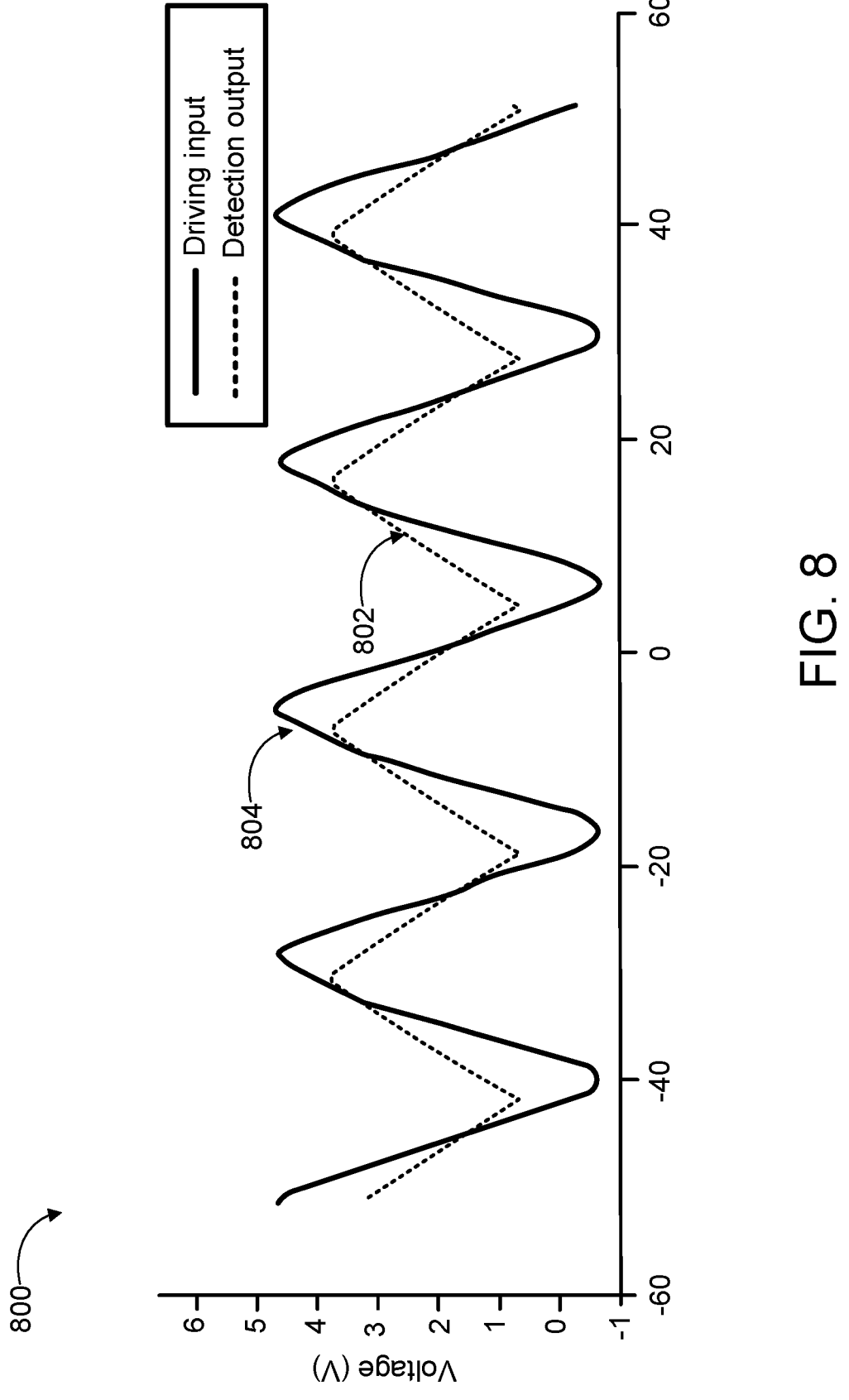
FIG. 8 shows an example of a driving signal for driving the optical element of the display system.

To evaluate the focal-length tracking module 108, the input signal to the focus-tunable lens is measured and the PSD output r is measured by an Analog Discovery oscilloscope. FIG. 8 shows an example graph 800 of the driving signal 802 and detection output 804 for driving the optical element of the display system. As can be seen, the output waveform matches that of the input. The high bandwidth of the PSD and the analog circuit enables us to track the focal length robustly in real-time. From FIG. 8, the delay of the focus-tunable lens (~3 ms) is shown.

Measuring the depth of the displayed focal planes is now described. A method similar to depth-from-defocus is used measure focal plane depth of the display system 100. When a camera is focusing at infinity, the defocus blur kernel size will be linearly dependent on the depth of the (virtual) object in diopter. This provides a method to measure the depths of the focal planes.

Figure 9:
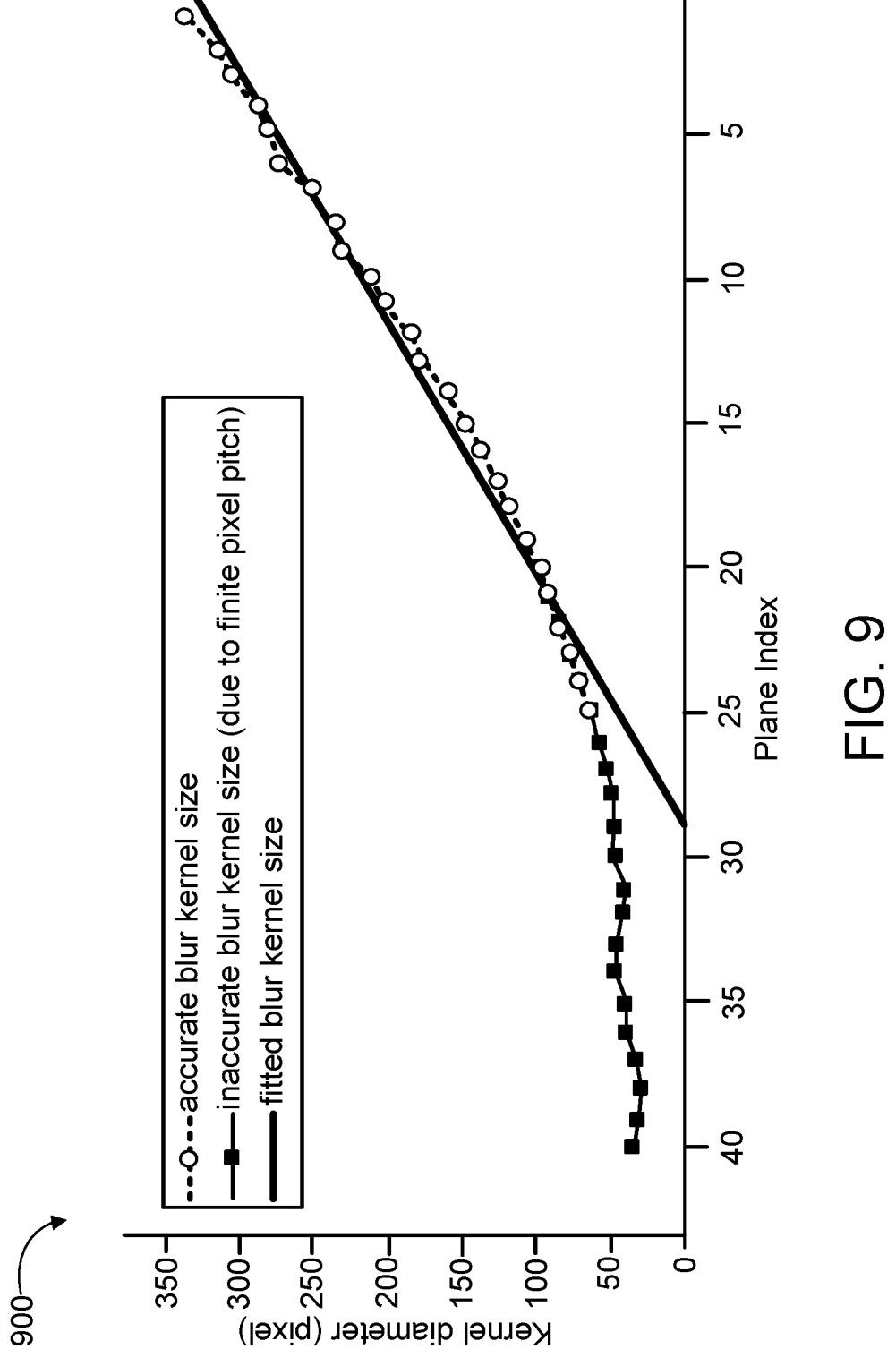
FIG. 9 shows a graph depicting blur kernel size.

For each of the focal plane, 3×3 pixels white spot at the center is displayed, and multiple images of various exposure time are captured, and the images are averaged to reduce noise. FIG. 9 shows a graph 900 including the measured results. When the blur-kernel diameters can be accurately estimated, (e.g., largely defocus spots on closer focal planes), the values fit to a straight line, indicating the depths of focal planes are uniformly separated in diopter. However, as the displayed spot size as a spot come into focus, the estimation of blur kernel diameters becomes inaccurate since an infinitesimal spot cannot be displayed due to the finite pixel pitch of the display. Because there were no special treatments to individual planes in terms of system design or algorithm, it is expected that these focal planes are placed accurately as well.

Figure 10:
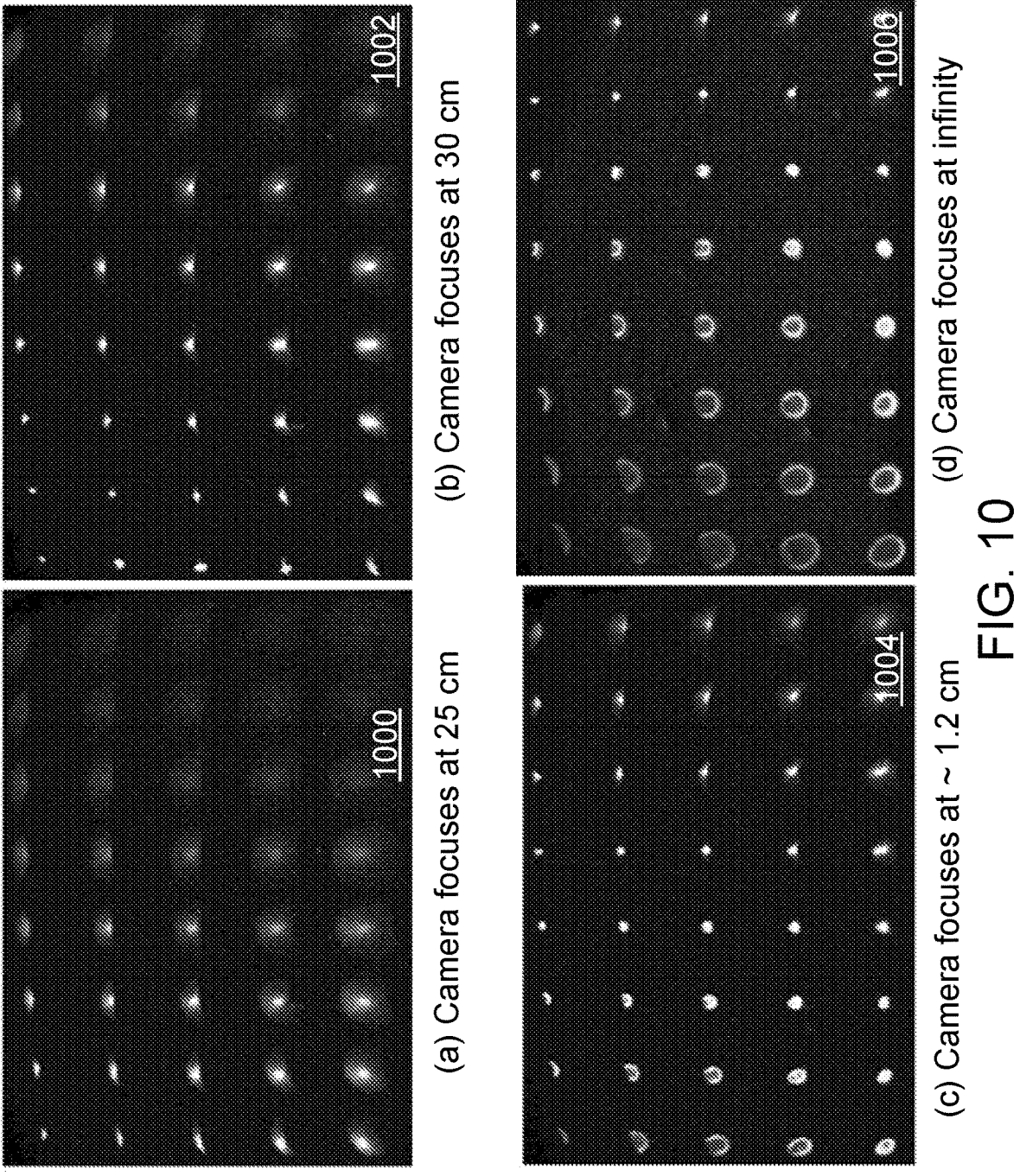
FIG. 10 shows measurements of a point spread function for the display system.

FIG. 10 shows measurements 1000, 1002, 1004, 1006 of a point spread function for the display system 100. To characterize the display system 100, the point spread function is measured with a Nikon D3400 using a 50 mm f/1.4 prime lens. A static scene is displayed that is composed of 40 3×3 spots with each spot at a different focal plane. A focal stack of 169 images is captured ranging from 0 to 4 diopters away from the focus-tunable lens. For improved contrast, the background and noise due to dust and scratches on the lens are removed by capturing the same focal stack with no spot shown on the display. The point spread function of the display at is shown at four different focus settings, one each in image 1000, 1002, 1004, 1006. The result shows that the display system 100 is able to display the spots at 40 depths concurrently within a frame, verifies the functionality of the described methods. The shape and the asymmetry of the blur kernels can be attributed to the spherical aberration of the focus-tunable lens as well as the throw of the projection lens on the DMD.

To evaluate the benefit provided by dense focal stacks, two multifocal displays are simulated: one with 4 focal planes and the other with 40 focal planes. The 40 focal planes are distributed uniformly in diopter from 0 to 4 diopters, and the 4-plane display has focal planes at the depth of the 5th, 15th, 25th, and 35th focal planes of the 40-plane display. The scene is composed of 28 resolution charts, each at a different depth from 0 to 4 diopters (please refer to the supplemental material for figures of the entire scene). The dimension of the scene is 1500×2000 pixels. The scene is rendered with three methods. First, a no depth filtering method is used. The depth channel of the images is directly quantized to obtain the focal planes of different depths. Second, a linear depth filtering method is used. A triangular filter is applied on the focal planes based on their depths. Third, an optimization-based filtering method is used. The desired retinal images are first rendered normally focused at 81 depths uniformly distributed across 0 to 4 diopters in the scene with a pupil diameter of 4 mm. Second, the optimization problem is solved to get the content to be displayed on the focal planes. The optimization process is initialized with the results of direct quantization and gradient descent is performed with 500 iterations to ensure convergence.

Figure 11C:
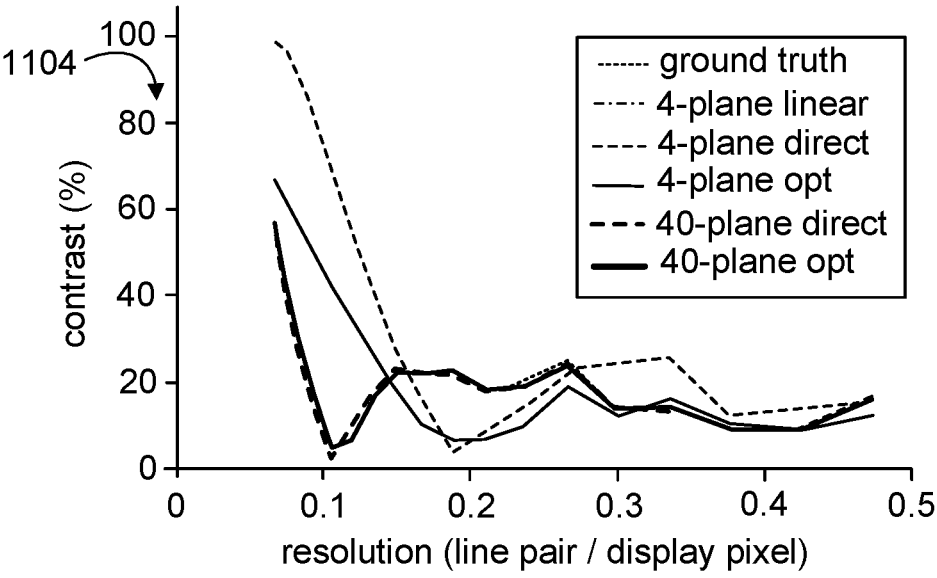
FIG. 11C shows an example transfer function of modulation for the results of FIGS. 11A-11B.
Figure 12F:
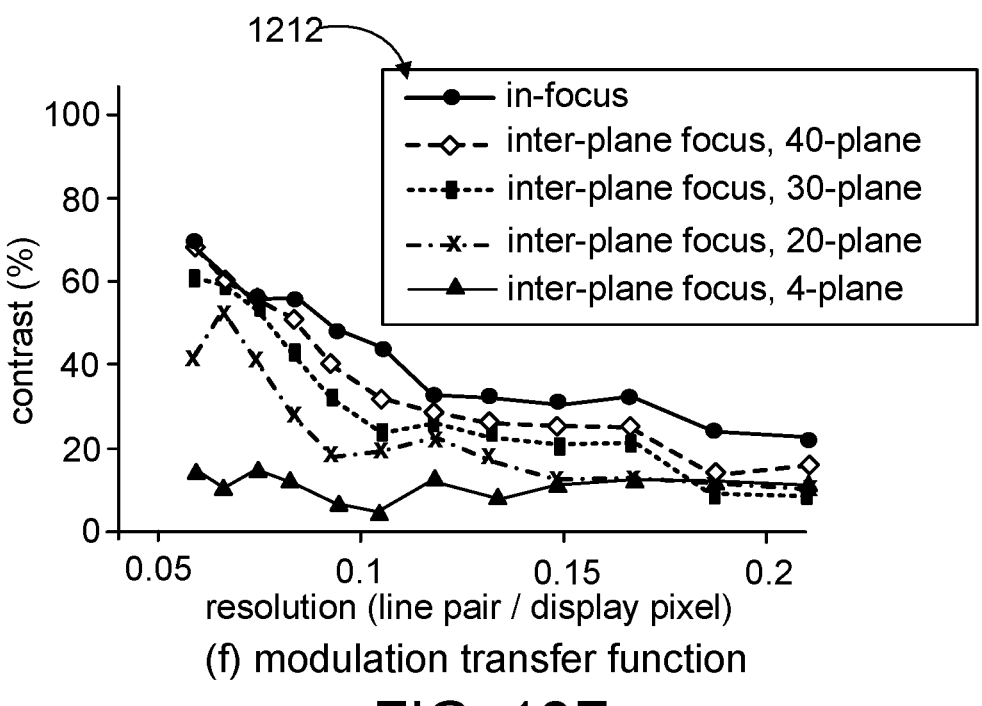

FIGS. 11A-11B show simulation results of scenes displayed by the display system, and FIG. 11C shows an example transfer function graph 1104 of modulation for the results of FIGS. 11A-11B. The simulation results 1100, 1102 are shown including 4-plane and 40-plane multifocal displays with direct quantization, linear depth filtering, and optimization-based filtering. The scene is at 0.02 diopters, which is an inter-plane location of the 4-plane display. Results 1100 include when the camera focuses at 0.02 diopters. Here, the 40-plane display achieves higher spatial resolution than the 4-plane display, regardless of the depth filtering algorithm. Results 1102 show when the camera focuses at 0.9 diopters. Here, the defocus blur on the 40-plane display closely follows that of the ground truth, whereas the 4-plane display fails to blur the low frequency contents. This can also be seen from the modulation transfer function plotted in graph 1104 of FIG. 11C.

Figure 12:
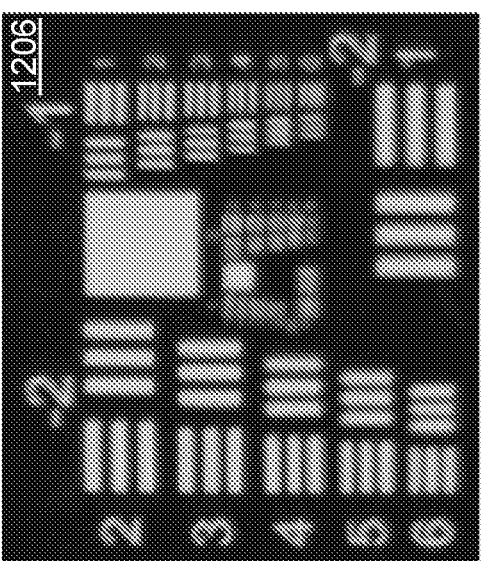
FIG. 12 shows captured inter-plane focused images and associated transfer functions.
Figure 12:
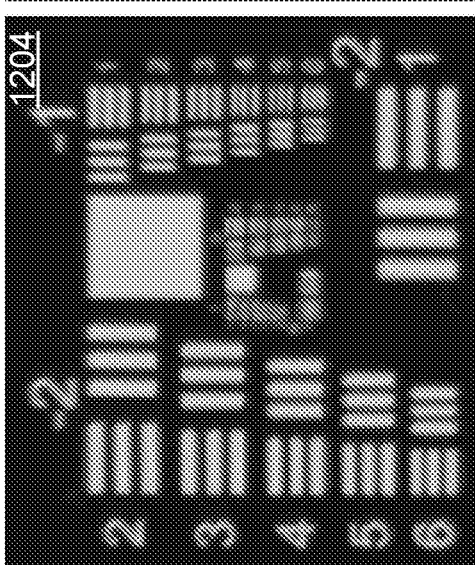
Figure 12:
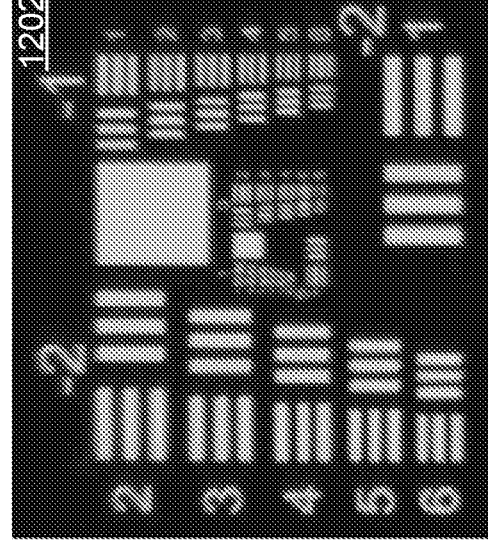
Figure 12:
Figure 12:
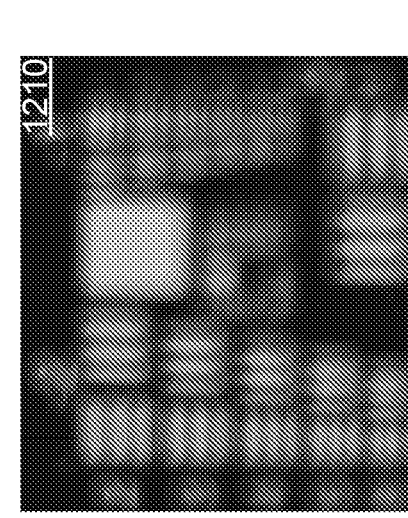
Figure 12:
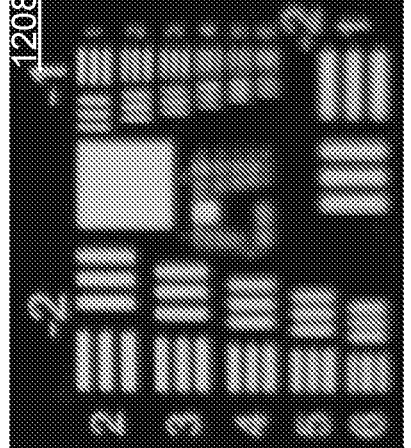

FIG. 12 shows captured inter-plane focused images using a 50 mm f/1.4 lens. The resolution chart locates on the 5th focal plane of the 40-plane display. A 4-plane and a 20-plane display are emulated by putting their focal planes on the 5, 15, 25, 35th and on the odd focal planes of the 40-plane display, respectively. For results of 1200, the camera focuses at the 5th focal plane for image 1202. For images 1204, 1206, cameras focus at the estimated inter-plane locations of the 40-plane display and the 30-plane displays, respectively. For image 1208, the camera focuses at the 6th focal plane, an inter-plane location of a 20-plane display. For image 1210, the camera focuses at the 10th focal plane, an inter-plane location of a 4-plane display. Their modulation transfer functions are plotted in graph 1212.

In some implementations, to evaluate the benefit provided by dense focal stacks in providing higher spatial resolution when the eye is focused at an inter-plane location, four multifocal displays with 4, 20, 30 and 40 focal planes are implemented in the display system 100. The 4-plane display has its focal planes on the 5, 15, 25, 35th focal planes of the 40-plane display, and the 20-plane display has its focal planes on all the odd-numbered focal planes. The resolution chart on the fifth focal plane of the 40-plane display for FIGS. 11A-11B and 12, which corresponds to a depth plane that all three displays can render.

To compare the worst-case scenario where an eye focuses on an inter-plane location, we focus the camera at the middle of two consecutive focal planes of each of the displays. In essence, we are reproducing the effect of VAC where the vergence cue forces the ocular lens to focus on an inter-focal plane. For the 40-plane display, this is between focal planes five and six. For the 20-plane display, this is on the sixth focal plane of the 40-plane display. And for the 4-plane display, this is on the tenth focal plane of the 40-plane display. We also focus the camera on the estimated inter-plane location of a 30-plane display. The results captured by a camera with a 50 mm f/1.4 lens are shown in FIG. 12. As can be seen, the higher number of focal planes (smaller focal-plane separation) results in higher spatial resolution at inter-plane locations.

Figure 13:
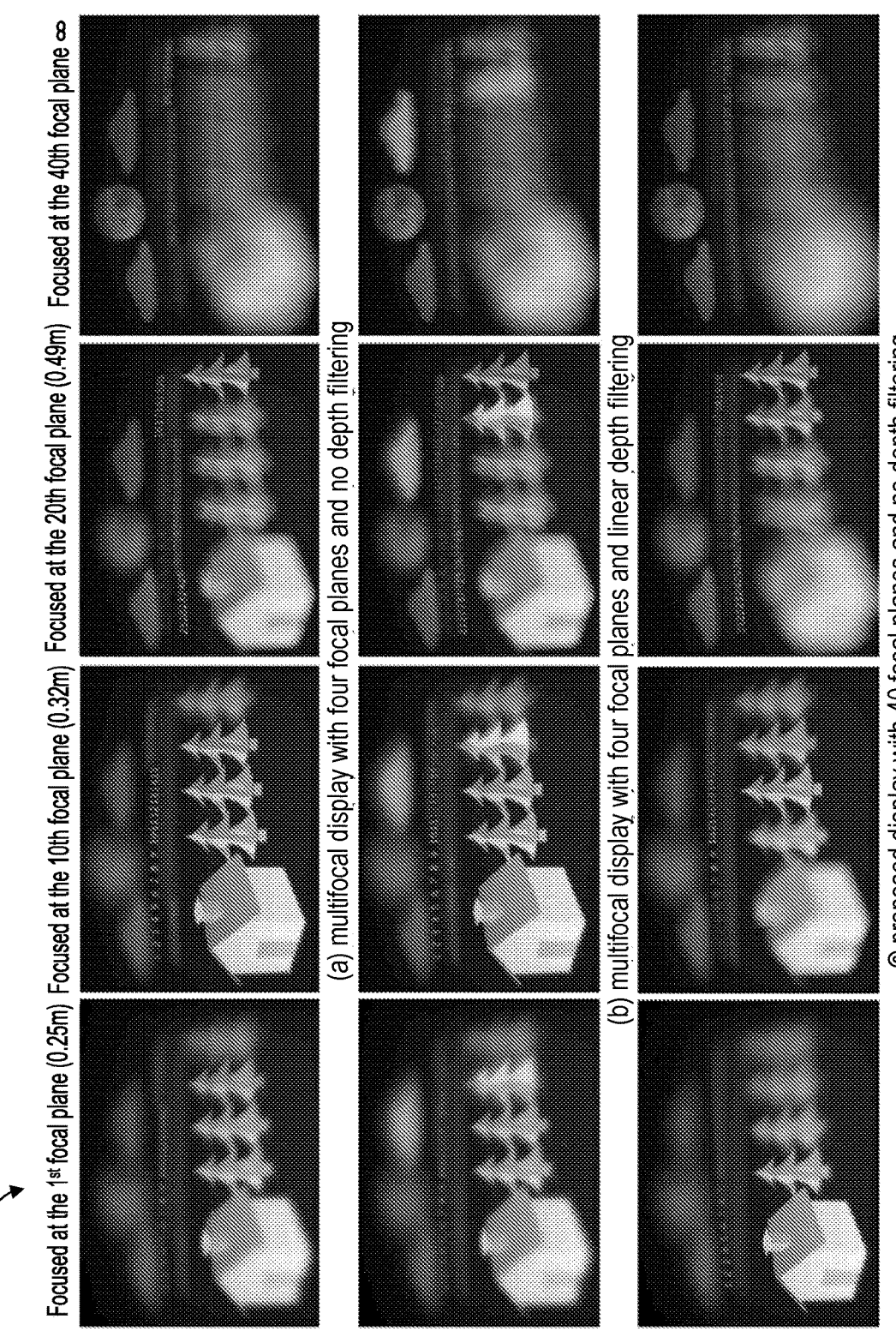
FIG. 13 shows a comparison of scenes displayed by the display system.

The display system 100 is compared with a 4-plane multifocal display on a real scene. The 4-plane multifocal display with our 40-plane prototype by showing contents on the 10, 20, 30, 40th focal planes. The images 1300 captured by the camera are shown in FIG. 13. The four focal planes of the multifocal display correspond to the 10th, 20th, 30th, and 40th focal plane. Images are captured with a 50 mm f/1.4 lens. Except for the first column, these focal planes are selected such that the 4-plane multifocal display is in sharp focus. In the scene, the digits are at their indicated focal planes; the house is at the first focal plane; the trees from left to right are at 5, 10, 15, 20th focal planes; the clouds and the moon are at 30, 35, 40th, respectively.

For the 4-plane multifocal display, when used without linear depth filtering, virtual objects at multiple depths are focus/defocus as groups. When used with linear depth filtering, same objects appearing in two focal planes reduces the visibility and thereby lowers the resolution of the display. In comparison, the method described produces smooth focus/defocus cues across the range of depths, and the perceived images at inter-plane locations (e.g. 0.25 m) have higher spatial resolution than the 4-plane display.

Figure 14:
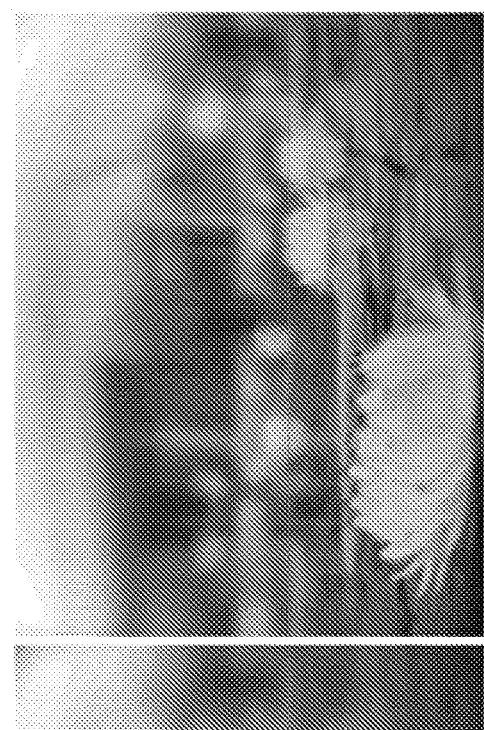
FIG. 14 shows example scenes displayed by the display system.
Figure 14:
Figure 14:
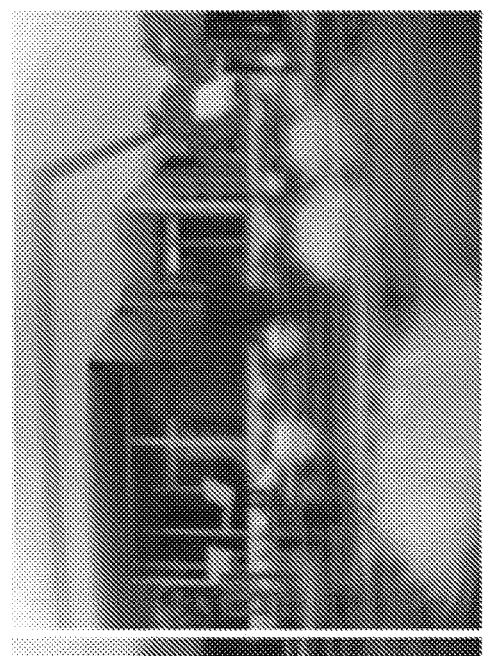
Figure 14:
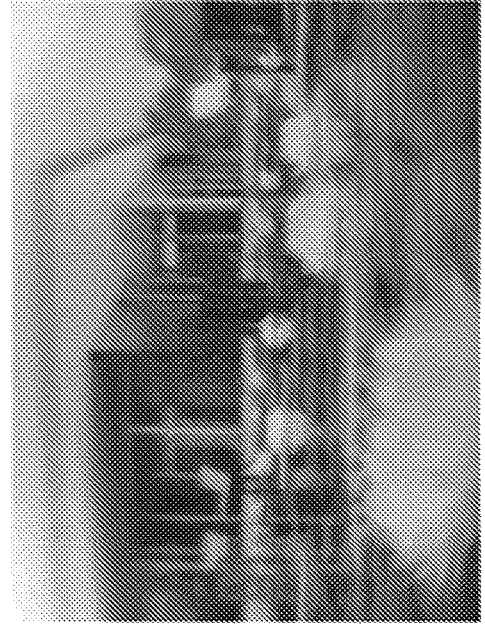

A more complex scene is rendered using Blender. From the rendered all-in-focus image and its depth map, linear filtering is performed, and the results displayed with the prototype. Focus stack images 1400 captured using a camera are shown in FIG. 14. Realistic focus and defocus cues in the captured images 1400 are observable. The captured images 1400 are focusing from near (shown at left) to far (shown at right) of a simulated scene rendered by Blender. The scene depth ranges from 50 cm (the flower at the bottom left) to infinity (the sky). The camera has a 50 mm f/1.4 lens.

Color display can be implemented by using a three color LED and cycling through them using time division multiplexing. This would lead to loss in time-resolution or focal stack resolution by a factor of 3. This loss in resolution can be completely avoided with OLED-based high speed displays since each group of pixels automatically generate the desired image at each focal stack.

The display system 100 can be extended to support stereo virtual reality displays. The most straight-forward method is to use two sets of the prototypes, one for each eye. Since all focal planes are shown in each frame, there is no need to synchronize the two focus-tunable lenses. It is also possible to create a stereo display with a single focus tunable lens and a single tracking module.

Figure 15:
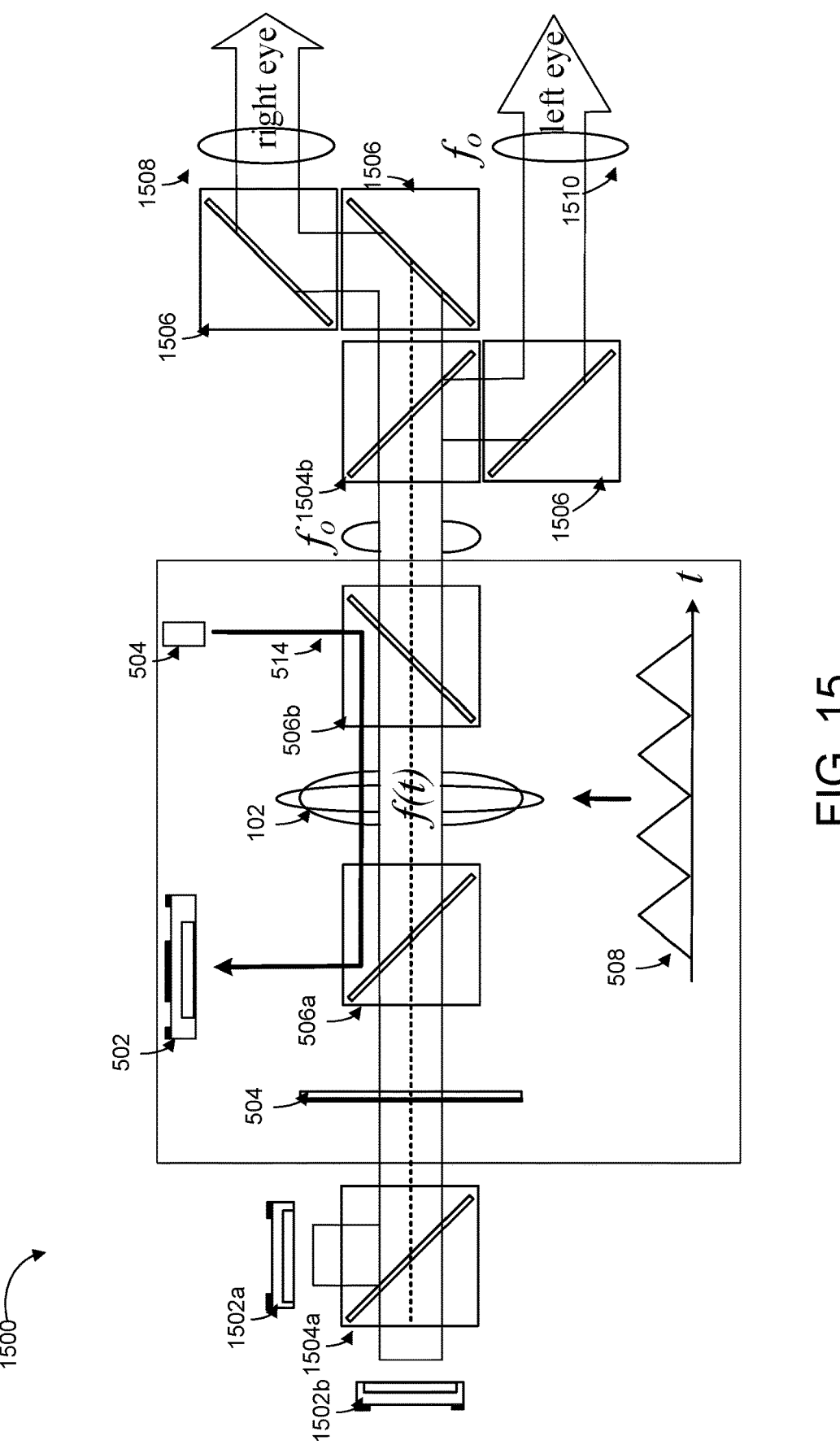
FIG. 15 shows an example display system with a stereoscopic module.

FIG. 15 shows an example display system 1500 with a stereoscopic module. The example shown includes the focal length tracking module 108 of FIG. 5A. The display system 1500 includes the optical element 102, beam source 504 for emitting a beam 514, display module 104, and position detector 502. The optical element 102 is driven by signal

508. Two LEDs 1502*a*, 1502*b* are added and emit light into a polarized beam splitter 1504*a* that redirects the light towards the display module 104. The two LEDs are light sources of the DMD projector. The light passes through the display module 104 (e.g., a projector), though shortpass dichroic mirrors 506*a*, 506*b*, and is split by another beam splitter 1504*b*. The two polarized beam splitters 1504*a*, 1504*b* are used to create dedicated light path for LED1 (to the right eye) and LED2 (to the left eye). Mirrors 1506 guide the split light to a right eye element 1508 and a left eye element 1510 for viewing (e.g., by a user). To show the content on the DMD to the right eye, only LED1 is turned on, and vice versa. To account for the extra distance created by the optics, we use two 4f systems (sharing the first lens) with f=75 mm to bring both eyes virtually to the aperture of the focus-tunable lens.

This design trades half of the focal planes to support stereo, and thereby, only requires one set of the prototype and additional optics. Polarization is used to ensure that each eye only sees the scene that is meant to see.

Figure 16A:
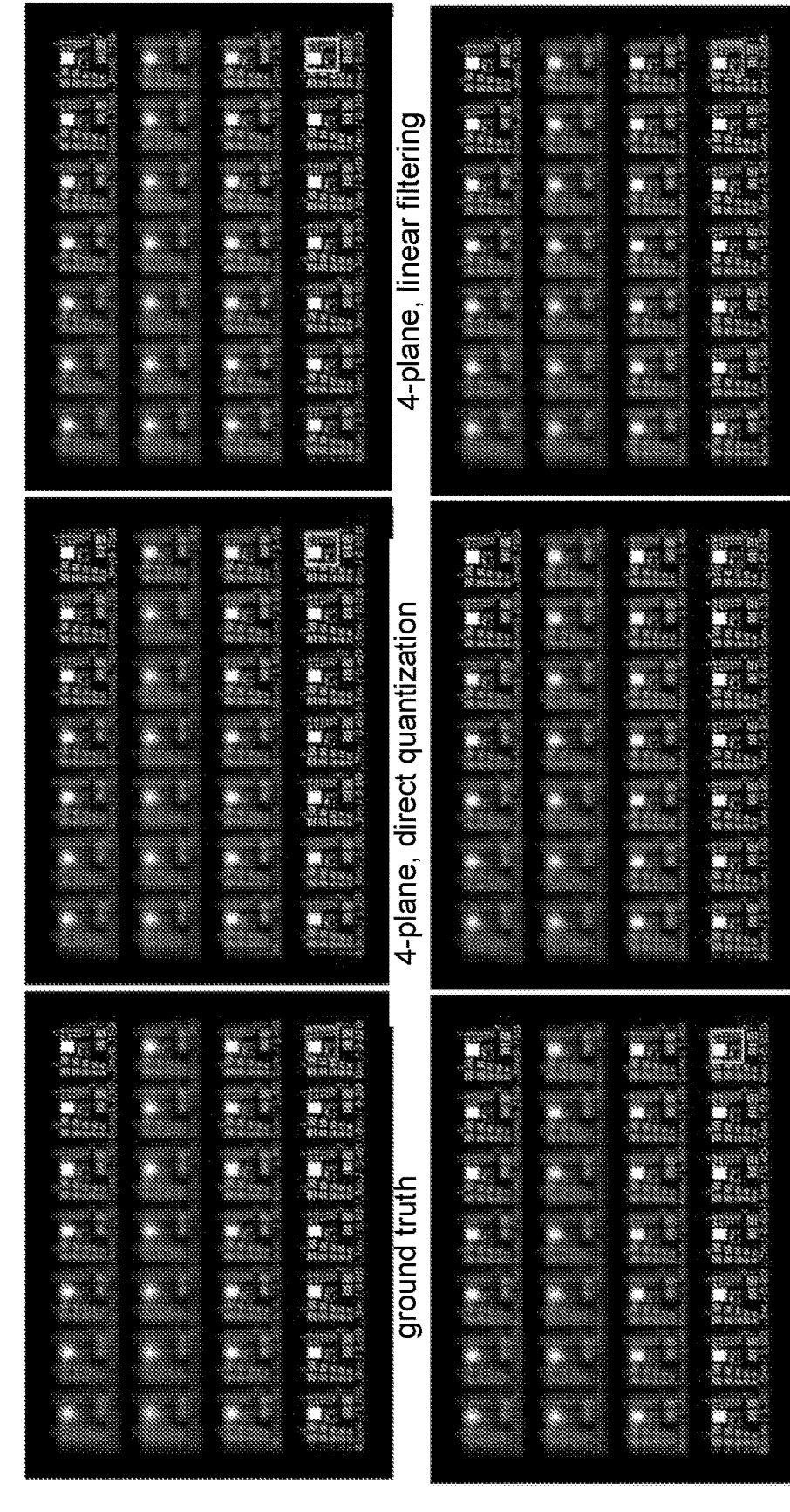
FIGS. 16A-16B show simulation results.
Figure 16B:
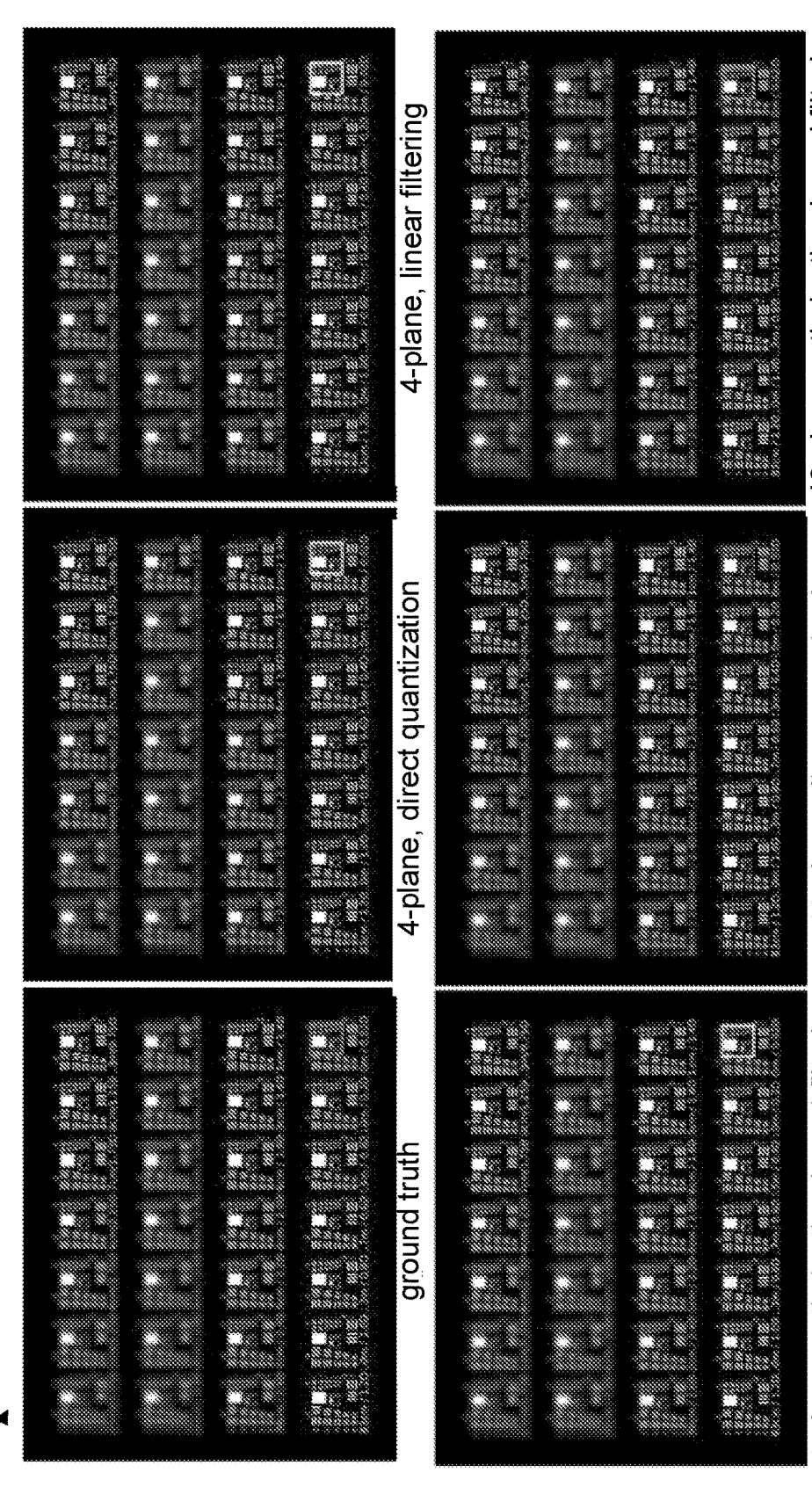

FIG. 16A-16B show the simulated images 1600, 1602 of FIG. 11A-11B in the paper with full field-of-view. There are 28 resolution charts located at various depths from 0 to 4 diopters (as indicated by beneath each of them). In the figure, the ground-truth rendered images and simulated retinal images are plotted when focused on 0.02 diopters and 0.9 diopters.

FIG. 17 shows an example process 1700 for displaying a scene by a display system (e.g., display system 100 of FIG. 1 or display system 1500 of FIG. 15), the scene including a set of focal planes. The display system 100 is configured to vary (1702) a light field projected from a display module according to a sequence of different image frames. The display system 100 is configured to direct (1704), with an optical element, the light field from the display module into a field of view of the display device. The display system 100 is configured to vary (1706) a focal length of the optical element through a series of different focal lengths while varying the light field to display (1708) the scene by presenting each of the image frames at a different one of the focal lengths.

FIG. 18 shows an example process 1800 for displaying a scene including a set of focal planes. A control system (e.g., control system 114 of FIG. 1) of a display system (e.g., display system 100 of FIG. 1 and display system 1500 of FIG. 15) is configured to determine (1802) a frame rate for displaying the image frames with a display module. The control system is configured to determine (1804 a set of focal planes for displaying a corresponding image frame of the scene. The control system is configured to generate (1806) a first control signal configured to cause an optical element to cycle through a range of focal lengths at a frequency lower than the frame rate. The control system is configured to generate (1808) a second control signal configured to cause the display module to display the corresponding image frame when a focal length of the optical element corresponds to a focal plane of the set of focal planes, the image frame corresponding to the focal plane for the depth of field of the scene.

While this specification contains many specific implementation details, these should not be construed as limitations on the scope of any invention or of what may be claimed, but rather as descriptions of features that may be specific to particular embodiments of particular devices. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

Particular embodiments of the subject matter have been described. Other embodiments are within the scope of the following claims. As one example, the processes depicted in the accompanying figures do not necessarily require the particular order shown, or sequential order, to achieve desirable results.

What is claimed is:

1. A display system comprising:

a display element configured to provide a variable light field along an optical path of the display system;

an optical element positioned in the optical path to receive light from the display element and direct the light into a field of view of the display system to display a scene in the field of view, the optical element having a focal length on an optical axis of the optical element that varies in response to a control signal;

a control system in communication with the display element and the optical element, the control system being programmed to generate the control signal to continuously track the focal length of the optical element and cause the optical element to cycle through a series of focal lengths at a frequency, each focal length of the series corresponding to a focal plane of a series of focal planes, wherein tracking the focal plane of the optical element comprises:

obtaining a measurement of the focal length of the optical element; and varying the light field from the display element, based on the measurement, to display the scene as a sequence of different image frames, the different image frames being synchronized with the control signal so that each of the different image frames is triggered to be presented at a focal plane of the series of focal planes;

wherein, during measuring of the focal length, the control signal is configured to cause the optical element to continuously adjust the focal length to sweep across a range between a minimum focal length and a maximum focal length.

2. The display system of claim 1, further comprising:

a focal length tracking element comprising a light emitting device and a light sensitive device, the focal length tracking element configured to perform the continuous tracking of the optical element by monitoring variations of the focal length of the optical element and providing continuous feedback to the control system.

3. The display system of claim 2, wherein the light emitting device is configured to emit a beam of light through the optical element; and the light sensitive device comprises a light-sensitive sensor configured to detect a deflection of the beam of light through the optical element, wherein an amount of the deflection of the beam of light is a function of the focal length of the optical element.

4. The display system of claim 2, wherein the light emitting device is configured to illuminate the optical element to generate an optical wavefront; and the light sensitive device is configured to receive the optical wavefront from the optical element and determine a curvature of the optical element.

5. The display system of claim 1, wherein the series of focal planes comprises at least five focal planes, and wherein each image frame is presented at each of the five focal planes.

6. The display system of claim 1, wherein the series of focal planes comprises at least 25 focal planes, and wherein each image frame is presented at each of the 25 focal planes.

7. The display system of claim 1, wherein each scene frame of the display element comprises an image frame at each focal plane of the series of focal planes.

8. The display system of claim 1, where the display element comprises projection optics arranged to direct light from a spatial light modulator to the optical element.

9. The display system of claim 1, wherein the optical element comprises a focus-tunable lens.

10. The display system of claim 1, wherein the optical element is an adjustable mirror or an adjustable phase mask.

11. The display system of claim 1, wherein the display element comprises a digital micromirror array.

12. The display system of claim 1, wherein the display element comprises one or more of an OLED screen and a microLED screen.

13. The display system of claim 1, wherein presenting each of the different image frames at a corresponding plurality of the series of focal planes comprises displaying at least one pixel at more than one focal plane of the series of focal planes for a particular image frame based on a bit-depth associated with the at least one pixel, wherein the display element is configured to display the particular image frame at an intensity based on the bit-depth.

14. The display system of claim 1, wherein the control signal is configured to cause the optical element to continuously adjust the focal length to sweep across the range between the minimum focal length and the maximum focal length based on continuously adjusting a voltage of the control signal.

15. A method of displaying a scene using a display device, comprising:

varying a light field projected from a display element according to a sequence of different image frames;

directing, with an optical element, the light field from the display element into a field of view of the display device; and varying a focal length of the optical element through a series of different focal lengths while measuring the focal length of the optical element and varying the light field, based on the measuring, to display the scene by presenting each of the image frames at a plurality of the focal lengths;

wherein, during measuring of the focal length, a control signal is configured to cause the optical element to continuously adjust the focal length to sweep across a range between a minimum focal length and a maximum focal length.

16. A method of displaying a scene comprising a series of image frames at different positions in a depth of field of the scene using a display device, comprising:

determining a display frame rate for displaying the image frames with a display element;

determining a set of focal planes for displaying a corresponding image frame of the scene;

generating a first control signal configured to cause an optical element to cycle through a range of focal lengths at a frequency lower than the display frame rate;

measuring a focal length of the optical element as the optical element cycles through the range of focal lengths; and generating, based on the measurement, a second control signal configured to cause the display element to display the corresponding image frame when a focal length of the optical element corresponds to a plurality of focal planes of the set of focal planes, the image frame corresponding to the plurality of focal planes for the depth of field of the scene;

wherein, during measuring of the focal length, the first control signal is configured to cause the optical element to continuously adjust the focal length to sweep across a range between a minimum focal length and a maximum focal length.

17. The method of claim 16, further comprising:

receiving, from a sensing element, a signal representing a variation of a focal length of the optical element; and adjusting, in response to the receiving, either the first control signal, the second control signal, or both the first and second control signals.

18. The method of claim 16, wherein the second control signal comprises an indicator representing, for one or more pixels of the scene, the image frame for displaying the one or more pixels by the display element.

19. The method of claim 16, wherein determining the frame rate comprises determining a per-frame bit-depth of the display element.

20. The method of claim 19, wherein determining the set of focal planes comprises selecting a maximum focal plane corresponding to a maximum distance, selecting a minimum focal plane corresponding to a minimum distance, and selecting a number of focal planes to interpolate between the maximum focal plane and the minimum focal plane based on the per-frame bit-depth of the display element.

21. The method of claim 16, wherein the set of focal planes comprises at least five focal planes.

* * * * *